United States Patent
Apkon et al.

(10) Patent No.: US 10,606,727 B2
(45) Date of Patent: Mar. 31, 2020

(54) TECHNIQUES FOR GENERATING A GRAPHICAL USER INTERFACE TO DISPLAY DOCUMENTATION FOR COMPUTER PROGRAMS

(71) Applicant: Soroco Private Limited, London (GB)

(72) Inventors: Jacob Harris Apkon, Cambridge, MA (US); Arjun Narayanaswamy, Bangalore (IN)

(73) Assignee: Soroco Private Limited, London (GB)

( * ) Notice: Subject to any disclaimer, the term of this patent is extended or adjusted under 35 U.S.C. 154(b) by 0 days.

(21) Appl. No.: 15/695,222

(22) Filed: Sep. 5, 2017

(65) Prior Publication Data

US 2018/0067739 A1    Mar. 8, 2018

Related U.S. Application Data

(60) Provisional application No. 62/384,066, filed on Sep. 6, 2016.

(51) Int. Cl.
*G06F 11/36* (2006.01)
*G06F 9/451* (2018.01)
(Continued)

(52) U.S. Cl.
CPC ...... *G06F 11/3604* (2013.01); *G06F 3/04842* (2013.01); *G06F 8/34* (2013.01);
(Continued)

(58) Field of Classification Search
CPC .............................. G06F 8/73; G06F 3/04842
See application file for complete search history.

(56) References Cited

U.S. PATENT DOCUMENTS 5,452,206 A    9/1995  Turrietta et al.
5,898,873 A *  4/1999  Lehr .................... G06F 11/323
                                                       345/440
(Continued)

FOREIGN PATENT DOCUMENTS

EP    1926021 A1    5/2008

OTHER PUBLICATIONS

Invitation to Pay Additional Fees for International Application No. PCT/US2017/050058 dated Oct. 13, 2017.
(Continued)

*Primary Examiner* — S. Sough
*Assistant Examiner* — Stephen D Berman
(74) *Attorney, Agent, or Firm* — Wolf, Greenfield & Sacks, P.C.

(57) ABSTRACT

According to at least one aspect, a system for generating a graphical user interface (GUI) to display documentation for computer program is provided. The system comprises at least one hardware processor, and at least one non-transitory computer-readable storage medium storing processor executable instructions that, when executed, cause the at least one hardware processor to perform a process for generating a graphical user interface to display documentation for computer program. The process includes accessing source code of a computer program, generating information indicative of execution flow of the computer program by analyzing the source code, executing the computer program, obtaining information gathered during execution of the computer program, and generating a GUI using the information indicative of the execution flow and the information gathered during execution of the computer program.

22 Claims, 13 Drawing Sheets

(51) Int. Cl.
*G06F 3/0484* (2013.01)
*G06F 8/73* (2018.01)
*G06F 8/34* (2018.01)

(52) U.S. Cl.
CPC ............... *G06F 8/73* (2013.01); *G06F 9/451* (2018.02); *G06F 9/453* (2018.02)

(56) References Cited

U.S. PATENT DOCUMENTS

| | | | |
|---|---|---|---|
| 5,953,526 A * | 9/1999 | Day | G06F 8/73 717/108 |
| 6,055,492 A * | 4/2000 | Alexander, III | G06F 11/348 702/179 |
| 6,286,003 B1 | 9/2001 | Muta | |
| 6,671,875 B1 | 12/2003 | Lindsey et al. | |
| 6,981,207 B1 | 12/2005 | Bakman et al. | |
| 6,996,806 B2 * | 2/2006 | Bates | G06F 11/3664 714/E11.207 |
| 7,114,149 B2 | 9/2006 | Aptus et al. | |
| 7,216,116 B1 * | 5/2007 | Nilsson | G06F 17/30398 |
| 8,464,234 B2 | 6/2013 | Novillo et al. | |
| 8,656,364 B1 * | 2/2014 | Kolawa | G06F 8/74 717/126 |
| 8,819,641 B1 | 8/2014 | Sweeney | |
| 8,850,415 B2 | 9/2014 | Huuck et al. | |
| 2002/0029231 A1 | 3/2002 | Aptus et al. | |
| 2003/0023955 A1 | 1/2003 | Bates et al. | |
| 2003/0037312 A1 | 2/2003 | Czech | |
| 2003/0061600 A1 * | 3/2003 | Bates | G06F 11/3664 717/133 |
| 2004/0031015 A1 | 2/2004 | Ben-Romdhane et al. | |
| 2004/0154010 A1 | 8/2004 | Marcuello et al. | |
| 2005/0066285 A1 | 3/2005 | Santori et al. | |
| 2006/0059459 A1 | 3/2006 | Grimaldi | |
| 2006/0259499 A1 | 11/2006 | Moulckers et al. | |
| 2007/0168992 A1 | 7/2007 | Bates | |
| 2008/0127233 A1 | 5/2008 | Neil et al. | |
| 2008/0168428 A1 | 7/2008 | Bates et al. | |
| 2009/0133033 A1 | 5/2009 | Lindo et al. | |
| 2009/0307664 A1 | 12/2009 | Huuck et al. | |
| 2010/0280863 A1 | 11/2010 | Wilcock et al. | |
| 2011/0197098 A1 * | 8/2011 | Sobolev | G06F 11/3676 714/38.1 |
| 2012/0054722 A1 * | 3/2012 | Takeda | G06F 8/314 717/128 |
| 2012/0137273 A1 * | 5/2012 | Meijler | G06F 11/3636 717/128 |
| 2012/0159442 A1 | 6/2012 | Dearman et al. | |
| 2012/0311545 A1 * | 12/2012 | Li | G06F 11/3676 717/132 |
| 2013/0104112 A1 | 4/2013 | Novillo et al. | |
| 2014/0223416 A1 | 8/2014 | Cohen et al. | |
| 2015/0007146 A1 | 1/2015 | Li et al. | |
| 2015/0095378 A1 | 4/2015 | Pomponio | |
| 2015/0212925 A1 | 7/2015 | Granshaw et al. | |
| 2015/0286555 A1 | 10/2015 | Neravati | |
| 2016/0011868 A1 | 1/2016 | Frenkiel et al. | |
| 2016/0259651 A1 * | 9/2016 | Nychis | G06F 9/455 |
| 2016/0259653 A1 * | 9/2016 | Nychis | G06F 9/451 |
| 2016/0357519 A1 | 12/2016 | Vargas | |
| 2017/0075792 A1 * | 3/2017 | Udvuleanu | G06F 11/3668 |
| 2017/0132108 A1 | 5/2017 | Valdez et al. | |
| 2017/0206350 A1 | 7/2017 | Salajegheh et al. | |
| 2018/0067729 A1 | 3/2018 | Apkon et al. | |
| 2018/0067836 A1 | 3/2018 | Apkon et al. | |

OTHER PUBLICATIONS

International Search Report and Written Opinion for International Application No. PCT/US2017/050058 dated Dec. 28, 2017.

Al-Msie'Deen, Visualizing Object-oriented Software for Understanding and Documentation. International Journal of Computer Science and Information Security. 2015;13(5):18-27.

International Preliminary Report on Patentability for International Application No. PCT/US2017/050058 dated Mar. 21, 2019.

* cited by examiner

TECHNIQUES FOR GENERATING A GRAPHICAL USER INTERFACE TO DISPLAY DOCUMENTATION FOR COMPUTER PROGRAMS

CROSS-REFERENCE TO RELATED APPLICATIONS

This application claims the benefit under 35 U.S.C. § 119(e) of U.S. Provisional Application Ser. No. 62/384,066, entitled "SYSTEMS AND METHODS FOR REAL-TIME PROCESS DOCUMENTATION" filed on Sep. 6, 2016, which is herein incorporated by reference in its entirety.

FIELD

Aspects of the technology described herein relate to techniques for applying static source code analysis techniques to a computer program to generate documentation for the computer program. Some aspects relate to techniques for generating a graphical user interface that permits a user to modify execution of the computer program through manipulation of the documentation for the computer program in the graphical user interface.

BACKGROUND

A software engineer typically creates a computer program by developing source code that comprises a set of instructions in one or more programming languages, such as C, C++, Java, Python, Ruby, C #, and Objective C, and converting the source code into executable code that may be executed by a computer system. The software engineer may insert comments into the source code, such as brief descriptions of the logic implemented in the source code, to make it easier for other software engineers to read and understand the source code. Non-technical individuals, however, are typically unable to read the source code or understand the implemented logic even with the embedded comments. As a result, software engineers typically create documentation for the computer program that describes the logic implemented in the computer program in plain language.

SUMMARY

According to at least one aspect, a system for generating documentation for a computer program is provided. The system comprises at least one hardware processor; and at least one non-transitory computer-readable storage medium storing processor executable instructions that, when executed by the at least one hardware processor, cause the at least one hardware processor to perform: accessing source code of a computer program comprising a plurality of software modules; analyzing the source code of the computer program at least in part by identifying at least one relationship between two or more software modules of the plurality of software modules; obtaining documentation for the computer program using the at least one relationship between two or more software modules of the plurality of software modules; and outputting the documentation.

In some embodiments, accessing the source code of the computer program comprises accessing a plurality of files and wherein at least one file from the plurality of files stores at least one software module from the plurality of software modules. In some embodiments, obtaining documentation for the computer program comprises: obtaining a plurality of pieces of documentation associated with a plurality of code portions of the source code; identifying an execution flow of the computer program using the at least one relationship between two or more software modules of the plurality of software modules; and organizing the plurality of pieces of documentation using the identified execution flow of the computer program.

In some embodiments, analyzing the source code comprises generating a plurality of abstract syntax trees (ASTs) comprising an AST for each of the two or more software modules of the plurality of software modules. In some embodiments, identifying the at least one relationship between the two or more software modules comprises: identifying at least one relationship between at least two ASTs in the plurality of ASTs; and generating a static information tree (SIT) representative of the at least one relationship between the at least two ASTs of the plurality of ASTs. In some embodiments, analyzing the source code comprises generating, using the SIT, a control flow graph indicative of an execution flow of the computer program. In some embodiments, the control flow graph comprises: a plurality of nodes each associated with a code portion from a plurality of code portions in the source code; and a plurality of links that connect the plurality of nodes and are representative of one or more execution paths for the computer program. In some embodiments, analyzing the source code comprises generating a business flow graph from the control flow graph at least in part by removing at least some nodes from the plurality of nodes in the control flow graph. In some embodiments, removing the at least some nodes from the plurality of nodes in the control flow graph comprises removing at least one node from the plurality of nodes that is associated with a code portion from the plurality of code portions that does not use at least one predetermined variable.

In some embodiments, the source code comprises at least one comment and at least one marker associated with the comment that indicates the at least one comment is to be included in the documentation. In some embodiments, obtaining the documentation comprises: identifying the at least one marker in the source code; extracting the at least one comment associated with the at least one marker in the source code; and adding the at least one comment to the documentation.

In some embodiments, obtaining documentation comprises converting at least a portion of the source code into natural language text. In some embodiments, outputting the documentation comprises at least one member selected from the group consisting of: printing the documentation, saving the documentation, generating a webpage comprising the documentation, and generating a document comprising the documentation.

In some embodiments, the computer program is configured to control another computer program to perform a task. In some embodiments, the computer program is configured to control the other computer program to perform the task at least in part by controlling a graphical user interface (GUI) of the other computer program to perform an action in furtherance of the task.

According to at least one aspect, a method for generating documentation for a computer program is provided. The method comprises: using at least one hardware processor to perform: accessing source code of a computer program comprising a plurality of software modules; analyzing the source code of the computer program at least in part by identifying at least one relationship between two or more software modules of the plurality of software modules; obtaining documentation for the computer program using the at least one relationship between two or more software modules of the plurality of software modules; and outputting the documentation.

In some embodiments, accessing the source code of the computer program comprises accessing a plurality of files and wherein at least one file from the plurality of files stores at least one software module from the plurality of software modules. In some embodiments, obtaining documentation for the computer program comprises: obtaining a plurality of pieces of documentation associated with a plurality of code portions of the source code; identifying an execution flow of the computer program using the at least one relationship between two or more software modules of the plurality of software modules; and organizing the plurality of pieces of documentation using the identified execution flow of the computer program.

In some embodiments, analyzing the source code comprises generating a plurality of abstract syntax trees (ASTs) comprising an AST for each of the two or more software modules of the plurality of software modules. In some embodiments, identifying the at least one relationship between the two or more software modules comprises: identifying at least one relationship between at least two ASTs in the plurality of ASTs; and generating a static information tree (SIT) representative of the at least one relationship between the at least two ASTs of the plurality of ASTs. In some embodiments, analyzing the source code comprises generating, using the SIT, a control flow graph indicative of an execution flow of the computer program. In some embodiments, the control flow graph comprises: a plurality of nodes each associated with a code portion from a plurality of code portions in the source code; and a plurality of links that connect the plurality of nodes and are representative of one or more execution paths for the computer program. In some embodiments, analyzing the source code comprises generating a business flow graph from the control flow graph at least in part by removing at least some nodes from the plurality of nodes in the control flow graph. In some embodiments, removing the at least some nodes from the plurality of nodes in the control flow graph comprises removing at least one node from the plurality of nodes that is associated with a code portion from the plurality of code portions that does not use at least one predetermined variable.

In some embodiments, the source code comprises at least one comment and at least one marker associated with the comment that indicates the at least one comment is to be included in the documentation. In some embodiments, obtaining the documentation comprises: identifying the at least one marker in the source code; extracting the at least one comment associated with the at least one marker in the source code; and adding the at least one comment to the documentation.

In some embodiments, obtaining documentation comprises converting at least a portion of the source code into natural language text. In some embodiments, outputting the documentation comprises at least one member selected from the group consisting of: printing the documentation, saving the documentation, generating a webpage comprising the documentation, and generating a document comprising the documentation.

In some embodiments, the computer program is configured to control another computer program to perform a task. In some embodiments, the computer program is configured to control the other computer program to perform the task at least in part by controlling a graphical user interface (GUI) of the other computer program to perform an action in furtherance of the task.

According to at least one aspect, at least one non-transitory computer-readable storage medium is provided. The at least one non-transitory computer-readable storage medium stores processor-executable instructions that, when executed by at least one hardware processor, cause the at least one hardware processor to perform: accessing source code of a computer program comprising a plurality of software modules; analyzing the source code of the computer program at least in part by identifying at least one relationship between two or more software modules of the plurality of software modules; obtaining documentation for the computer program using the at least one relationship between two or more software modules of the plurality of software modules; and outputting the documentation.

According to at least one aspect, a system for generating documentation for a computer program is provided. The system comprises at least one hardware processor; and at least one non-transitory computer-readable storage medium storing processor executable instructions that, when executed by the at least one hardware processor, cause the at least one hardware processor to perform: accessing source code of a computer program; analyzing the source code of the computer program at least in part by identifying an execution flow of the computer program; obtaining documentation for the computer program using the identified execution flow; and outputting the documentation.

In some embodiments, obtaining documentation for the computer program comprises: obtaining a plurality of pieces of documentation associated with a plurality of code portions of the source code; and organizing the plurality of pieces of documentation using the identified execution flow of the computer program.

According to at least one aspect, a system is provided. The system comprises at least one hardware processor; and at least one non-transitory computer-readable storage medium storing processor executable instructions that, when executed by the at least one hardware processor, cause the at least one hardware processor to perform: accessing source code of a computer program; generating information indicative of execution flow of the computer program at least in part by analyzing the source code; executing the computer program; obtaining information gathered during execution of the computer program; and generating a graphical user interface (GUI) using the information indicative of the execution flow and the information gathered during execution of the computer program, the generating comprising generating a first view comprising: a visualization of the execution flow of the computer program; and a plurality of GUI elements, each of the plurality of GUI elements associated with a corresponding code portion in the source code of the computer program.

In some embodiments, obtaining the information gathered during execution of the computer program comprises obtaining at least one of: an image, a video, or a text file generated during execution of the computer program. In some embodiments, generating the first view comprises modifying a characteristic of at least one GUI element of the plurality of GUI elements based on the information gathered during execution of the computer program. In some embodiments, the characteristic of the at least one GUI element comprises at least one member selected from the group consisting of: a size, a shape, and a color.

In some embodiments, the first view comprises a link between at least two GUI elements of the plurality of GUI elements representative of a relationship between the corresponding code portions associated with the at least two GUI elements. In some embodiments, generating the first view comprises modifying a characteristic of the link based on the information gathered during execution of the computer program. In some embodiments, the characteristic of the link comprises at least one member selected from the group consisting of: a size, a shape, and a color.

In some embodiments, the processor-executable instructions further cause the at least one processor to perform: transitioning the GUI from the first view to a second view upon selection of at least one GUI element of the plurality of GUI elements. In some embodiments, the second view comprises documentation for the corresponding code portion associated with the selected at least one GUI element. In some embodiments, the documentation comprises natural language text.

In some embodiments, the computer program is configured to control another computer program to perform a task. In some embodiments, the computer program is configured to control the other computer program to perform the task at least in part by controlling a graphical user interface (GUI) of the other computer program to perform an action in furtherance of the task.

According to at least one aspect, a method is provided. The method comprises using at least one hardware processor to perform: accessing source code of a computer program; generating information indicative of execution flow of the computer program at least in part by analyzing the source code; executing the computer program; obtaining information gathered during execution of the computer program; and generating a graphical user interface (GUI) using the information indicative of the execution flow and the information gathered during execution of the computer program, the generating comprising generating a first view comprising: a visualization of the execution flow of the computer program; and a plurality of GUI elements, each of the plurality of GUI elements associated with a corresponding code portion in the source code of the computer program.

In some embodiments, obtaining the information gathered during execution of the computer program comprises obtaining at least one of: an image, a video, or a text file generated during execution of the computer program. In some embodiments, generating the first view comprises modifying a characteristic of at least one GUI element of the plurality of GUI elements based on the information gathered during execution of the computer program. In some embodiments, the characteristic of the at least one GUI element comprises at least one member selected from the group consisting of: a size, a shape, and a color.

In some embodiments, the first view comprises a link between at least two GUI elements of the plurality of GUI elements representative of a relationship between the corresponding code portions associated with the at least two GUI elements. In some embodiments, generating the first view comprises modifying a characteristic of the link based on the information gathered during execution of the computer program. In some embodiments, the characteristic of the link comprises at least one member selected from the group consisting of: a size, a shape, and a color.

In some embodiments, the processor-executable instructions further cause the at least one processor to perform: transitioning the GUI from the first view to a second view upon selection of at least one GUI element of the plurality of GUI elements. In some embodiments, the second view comprises documentation for the corresponding code portion associated with the selected at least one GUI element. In some embodiments, the documentation comprises natural language text.

In some embodiments, the computer program is configured to control another computer program to perform a task. In some embodiments, the computer program is configured to control the other computer program to perform the task at least in part by controlling a graphical user interface (GUI) of the other computer program to perform an action in furtherance of the task.

According to at least one aspect, at least one non-transitory computer-readable storage medium. The at least one non-transitory computer-readable storage medium stores processor-executable instructions that, when executed by at least one hardware processor, cause the at least one hardware processor to perform: accessing source code of a computer program; generating information indicative of execution flow of the computer program at least in part by analyzing the source code; executing the computer program; obtaining information gathered during execution of the computer program; and generating a graphical user interface (GUI) using the information indicative of the execution flow and the information gathered during execution of the computer program, the generating comprising generating a first view comprising: a visualization of the execution flow of the computer program; and a plurality of GUI elements, each of the plurality of GUI elements associated with a corresponding code portion in the source code of the computer program.

According to at least one aspect, a system is provided. The system comprises at least one hardware processor; and at least one non-transitory computer-readable storage medium storing processor-executable instructions that, when executed by the at least one hardware processor, cause the at least one hardware processor to perform: accessing source code of a computer program; generating a graphical user interface (GUI) including: documentation for the computer program; and at least one GUI element for receiving user input for modifying execution of the computer program; receiving user input via the at least one GUI element; and modifying execution of the computer program based on the user input provided through the at least one GUI element.

In some embodiments, modifying execution of the computer program comprises setting at least one value of at least one parameter of the computer program based on the user input provided through the at least one GUI element. In some embodiments, modifying execution of the computer program comprises identifying, based on the user input provided through the at least one GUI element, one or more portions of the source code to not execute during execution of the computer program. In some embodiments, the processor-executable instructions further cause the at least one processor to perform: modifying presentation of the documentation in the GUI based on the user input provided through the at least one GUI element. In some embodiments, modifying presentation of the documentation in the GUI comprises visually highlighting a portion of the documentation affected by the modification.

In some embodiments, modifying execution of the computer program comprises generating modified source code for the computer program using the source code and the user input. In some embodiments, modifying execution of the computer program comprises generating a modified executable code based on the modified source code and executing the modified executable code.

In some embodiments, the computer program is configured to read at least one value from a file during execution and wherein modifying execution of the computer program comprises changing the at least one value in the file. In some embodiments, the at least one GUI element comprises at least one element selected from the group consisting of: a drop-down list, a radio button, a toggle button, a checkbox, a text field, and a slider.

In some embodiments, the processor-executable instructions further cause the at least one processor to perform: generating information indicative of execution flow of the computer program at least in part by analyzing the source code; and obtaining the documentation using the information indicative of execution flow of the computer program. In some embodiments, generating the GUI comprises: generating a visualization of the execution flow of the computer program that comprises a plurality of GUI elements each associated with a corresponding code portion in the source code of the computer program.

In some embodiments, the processor-executable instructions further cause the at least one processor to perform: generating initial documentation for the computer program at least in part by analyzing the source code of the computer program; obtaining information gathered during execution of the computer program; and updating the initial documentation by using the information gathered during execution of the computer program to obtain the documentation to include in the GUI. In some embodiments, analyzing the source code of the computer program comprises generating at least one abstract syntax tree (AST) for the source code. In some embodiments, the source code of the computer program comprises a plurality of software modules, and wherein generating the at least one AST for the source code comprises generating an AST for each of the plurality of software modules.

In some embodiments, the computer program is configured to control another computer program to perform a task. In some embodiments, the computer program is configured to control the other computer program to perform the task at least in part by controlling a graphical user interface (GUI) of the other computer program to perform an action in furtherance of the task.

According to at least one aspect, a method is provided. The method comprises using at least one hardware processor to perform: accessing source code of a computer program; generating a graphical user interface (GUI) including: documentation for the computer program; and at least one GUI element for receiving user input for modifying execution of the computer program; receiving user input via the at least one GUI element; and modifying execution of the computer program based on the user input provided through the at least one GUI element.

In some embodiments, modifying execution of the computer program comprises setting at least one value of at least one parameter of the computer program based on the user input provided through the at least one GUI element. In some embodiments, modifying execution of the computer program comprises identifying, based on the user input provided through the at least one GUI element, one or more portions of the source code to not execute during execution of the computer program. In some embodiments, the processor-executable instructions further cause the at least one processor to perform: modifying presentation of the documentation in the GUI based on the user input provided through the at least one GUI element. In some embodiments, modifying presentation of the documentation in the GUI comprises visually highlighting a portion of the documentation affected by the modification.

In some embodiments, modifying execution of the computer program comprises generating modified source code for the computer program using the source code and the user input. In some embodiments, modifying execution of the computer program comprises generating a modified executable code based on the modified source code and executing the modified executable code.

In some embodiments, the computer program is configured to read at least one value from a file during execution and wherein modifying execution of the computer program comprises changing the at least one value in the file. In some embodiments, the at least one GUI element comprises at least one element selected from the group consisting of: a drop-down list, a radio button, a toggle button, a checkbox, a text field, and a slider.

In some embodiments, the processor-executable instructions further cause the at least one processor to perform: generating information indicative of execution flow of the computer program at least in part by analyzing the source code; and obtaining the documentation using the information indicative of execution flow of the computer program. In some embodiments, generating the GUI comprises: generating a visualization of the execution flow of the computer program that comprises a plurality of GUI elements each associated with a corresponding code portion in the source code of the computer program.

In some embodiments, the processor-executable instructions further cause the at least one processor to perform: generating initial documentation for the computer program at least in part by analyzing the source code of the computer program; obtaining information gathered during execution of the computer program; and updating the initial documentation by using the information gathered during execution of the computer program to obtain the documentation to include in the GUI. In some embodiments, analyzing the source code of the computer program comprises generating at least one abstract syntax tree (AST) for the source code. In some embodiments, the source code of the computer program comprises a plurality of software modules, and wherein generating the at least one AST for the source code comprises generating an AST for each of the plurality of software modules.

In some embodiments, the computer program is configured to control another computer program to perform a task. In some embodiments, the computer program is configured to control the other computer program to perform the task at least in part by controlling a graphical user interface (GUI) of the other computer program to perform an action in furtherance of the task.

According to at least one aspect, at least one non-transitory computer-readable storage medium is provided. The at least one non-transitory computer-readable storage medium stores processor-executable instructions that, when executed by at least one hardware processor, cause the at least one hardware processor to perform: accessing source code of a computer program; generating a graphical user interface (GUI) including: documentation for the computer program; and at least one GUI element for receiving user input for modifying execution of the computer program; receiving user input via the at least one GUI element; and modifying execution of the computer program based on the user input provided through the at least one GUI element.

BRIEF DESCRIPTION OF DRAWINGS

Various aspects and embodiments will be described with reference to the following figures. It should be appreciated that the figures are not necessarily drawn to scale. Items appearing in multiple figures are indicated by the same reference number in all the figures in which they appear.

DETAILED DESCRIPTION

Figure 1:
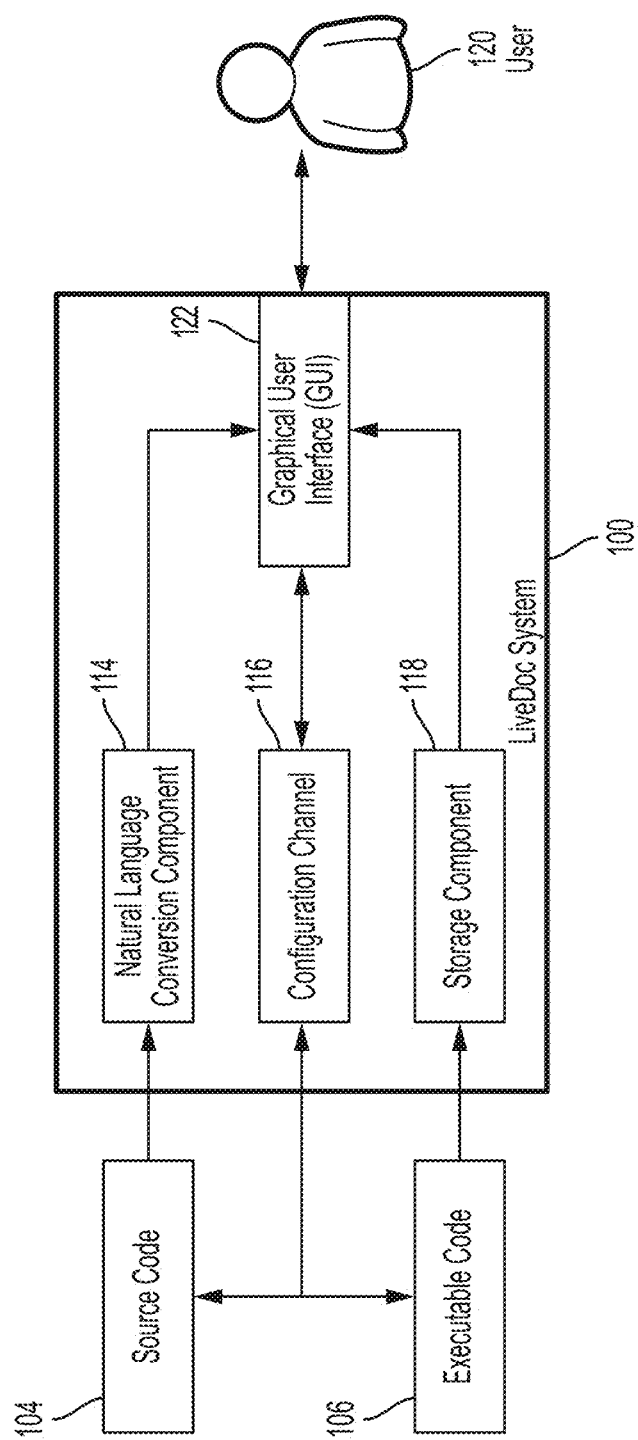
FIG. 1 is a diagram of an example system for generating documentation for a computer program, according to some embodiments of the technology described herein.

As discussed above, software engineers typically create and maintain documentation for a computer program to assist non-technical individuals in understanding the logic implemented in the computer program. Conventional document creation computer applications, such as DOXYGEN and JAVADOC, attempt to ease the burden of creating documentation for Application Programming Interfaces (APIs) of a computer program. These conventional applications extract the documentation directly from comments embedded in the source code of the computer program without analyzing the source code itself. The resulting documentation contains a listing of functions that may be accessed through the API along the extracted comments from the source code associated with these functions.

The inventors have recognized and appreciated that conventional document generation applications only create documentation for a limited portion of a computer program, i.e., the API. As a result, these conventional document generation applications fail to extract information regarding the execution flow of the computer program such as the logic implemented to create functions. For example, documentation created by such conventional documentation generation applications does not describe the order in which certain functions are called and/or which conditions (if any) must be met for functions to be executed. As a result, the documentation created by these applications is not in plain language suitable for non-technical individuals because API documentation is intended for consumption by software engineers developing computer programs that interact with the API.

Accordingly, aspects of the present disclosure relate to new techniques for automated generation of documentation for computer programs. In some embodiments, the documentation may be generated using, for example, the source code for the computer program. In some embodiments, the source code may be analyzed to determine an execution flow of the computer program. The execution flow of the computer program may be represented as, for example, a control flow graph that comprises a plurality of nodes each associated with a code portion of the source code. These nodes may be connected by links that are indicative of the order of execution of the code portions. The control flow graph may be employed to, for example, create an index for the documentation that is organized in a logical manner (e.g., organized by order of execution). The index may comprise an entry for at least some of the code portions in the control flow graph. Documentation may then be obtained (or otherwise generated) for one or more entries in the index by analyzing the source code (e.g., the respective code portion associated with the entry). For example, the documentation may be extracted from comments in a code portion and/or generated by converting the code portion to natural language text (e.g., text that employs commonly used words in simple sentences) that a non-technical individual is able to understand. The generated documentation for each code portion in combination with the index that logically organizes the code portions provides documentation for the entire computer program that is easy to navigate and understand for non-technical individuals.

The natural language text in the documentation may be supplemented by other information, such as information gathered during execution of the computer program. This supplemental information may further assist non-technical individuals to understand how the computer program functions. For example, screenshots of a graphical user interface (GUI) of the computer program during execution of one or more code portions may be incorporated into the documentation. Additionally (or alternatively), information indicative of how many times one or more code portion is executed may be incorporated into the documentation.

The inventors have further appreciated that non-technical individuals may want to modify how the computer program executes. For example, a software engineer may deliver a computer program to a client and the client may want to make small changes to the computer program. Conventionally, the client would need to communicate the desired changes to the software engineer who, in turn, creates a modified version of the computer program. The time required to perform this revision process may be substantial and increase the total cost of developing the computer program paid by the client.

Accordingly, aspects of the present disclosure relate to new techniques for permitting non-technical individuals to make modifications to a computer program without directly interacting with the source code. In some embodiments, a user (e.g., a non-technical individual) may manipulate the documentation for a computer program through a GUI to make changes to the computer program. For example, the documentation for the computer program may comprise one or more configurable fields that the user may manipulate to modify the computer program. A change to a value in configurable field may automatically trigger a change to the computer program. The computer program may be modified in any of a variety of ways. For example, modified source code may be generated that includes the change and converted into a modified executable code that may be executed in place of the original executable code for the computer program. In another example, the computer program may be configured to read one or more values from a file during execution. In this example, the values in the file may be adjusted based on the user input to change the values read-in by the computer program during execution.

In some embodiments, the computer program for which the documentation is being generated for is a software robot computer program (hereinafter, "software robot"). Software robots may be, for example, computer programs configured to programmatically control one or more other computer programs (e.g., one or more application programs and/or one or more operating systems) to perform one or more tasks at least in part via the GUIs and/or APIs of the other computer program(s). A task may be, for example, a sequence of one or more actions (e.g., buttons clicks and/or keystrokes) that culminates in an objective being completed such as resetting a password or creating a document. A software robot may perform one or more tasks to complete a process. Some aspects of software robots are described in U.S. Patent Publication No. 2016-0259651, titled "SOFTWARE ROBOTS FOR PROGRAMMATICALLY CONTROLLING COMPUTER PROGRAMS TO PERFORM TASKS," published on Sep. 8, 2016, which is incorporated herein by reference in its entirety.

Software robots may be, for example, employed by companies to automate one or more processes with business relevance. Examples of such processes include: processing purchase orders (PO's) and processing insurance claims. Thereby, companies may reduce the time employees spend performing mundane processes by deploying software robots. These companies may, however, wish to still have some level of control over their processes. A manager, for example, may be accustomed to easily being able to change how a process is performed by simply asking an employee to perform the process differently. In cases where a software robot is performing the process, the manager would typically need to request software engineers to modify the underlying source code for the software robot and wait for the new software robot to be deployed. Accordingly, the techniques described herein to automatically generate documentation to display via a GUI and/or permit a user (e.g., a non-technical person) to make changes to the documentation in the GUI may be employed to significantly lower the barriers for a company to modify a process being performed by a software robot. For example, a manager may easily manipulate documentation for a software robot in a GUI to change how the software robot performs a process. Thereby, the manager can obtain the benefits of deploying software robots to automate a business process while still being able to easily make changes to the process as the needs of the company change.

Example Implementation

Some aspects of the present disclosure relate to a system for automatically generating documentation for a computer program. Such a system may be referred to herein as a "Live Documentation" system or a "LiveDoc" system. The documentation generated in accordance with the techniques described herein may be referred to as "Live Documentation" or "LiveDoc." The system may comprise, for example, at least one hardware processor that coupled to at least one non-transitory computer-readable storage medium storing processor executable instructions that, when executed by the at least one hardware processor, cause the at least one hardware processor to perform various functions to automatically generate documentation. The instructions may cause the hardware processor to access source code of a computer program. The source code may be, for example, a set of instructions in one or more programming languages, such as C, C++, Java, Python, Ruby, C #, and Objective C. These instructions may be sub-divided into multiple software modules. These software modules may be stored separately in their own files or together in one file.

The instructions may further cause the hardware processor to analyze the source code of the computer program. The source code may be analyzed by, for example, identifying relationships between the software modules in the source code. These relationships may be indicative of, for example, functions in a first software module that are defined (or otherwise created) in a second software module. The relationships between software modules may be identified by, for example, creating an abstract syntax tree (AST) for each of the software modules. These ASTs may comprise a plurality of nodes that represent a construct (e.g., a software module, a function call, a function definition, and/or an assignment statement) in the code of a software module that are interconnected by links that illustrate the relationships between constructs within the AST. Once the ASTs have been generated, relationships between ASTs may be generated by identifying relationships between constructs in different ASTs. For example, a first AST in a set of ASTs may be parsed to identify a first construct in the first AST that references a second construct in another AST (e.g., a function call for a function that is defined in another software module). In this example, one or more other ASTs in the set of ASTs may be searched until the second construct is located (e.g., the definition for the function is located). Once the second construct has been located, the relationship between the first and second constructs may be stored. These relationships between the ASTs may be embodied in, for example, a static information tree (SIT).

The instructions may further cause the hardware processor to obtain documentation for the computer program using the identified relationships between software modules, such as the SIT. In some embodiments, the documentation may be obtained at least in part by generating a control flow graph for the computer program that is indicative of the execution flow of the computer program using the generated SIT. The control flow graph may comprise, for example, a plurality of nodes each associated with a code portion from the source code and a plurality of links that illustrate relationships between the code portions. The code portions may be, for example, one or more lines of code from one or more software modules in the source code. The links may be representative of an execution order of the code portions. The SIT may be employed to, for example, identify the location of function definitions for function calls in a given code portion. For example, a code portion may comprise a function call for a function that is located in another portion of the source code. In this example, the SIT may be employed to identify the location of the function definition and associate the function definition with the function call in the code portion.

The control flow graph may serve as, for example, an index for the documentation where each code portion is an entry in the index and the entries are ordered based on execution order. Thereby, natural language text may be associated with each of these entries (and their associated code portions) to form documentation that is easy to understand and search for non-technical individuals. The documentation for each entry may be, for example, obtained directly from comments embedded in the code portions and/or generated by converting the code portions to natural language text.

It should be appreciated that not all of the nodes in the control flow graph may be employed to create the index for the documentation. For example, a simplified version of the control flow graph referred to herein as a "business flow graph" may be used instead. Thereby, the documentation may be simplified to make it easier to understand for non-technical individuals. The business flow graph may be created by, for example, removing nodes from the control flow graph that are specific to the implementation of the process in the source code. These nodes (and their associated code portions) may be separated from the remaining nodes (and their associated code portions) in any of a variety of ways. For example, these nodes may be removed by removing one or more of the nodes in the control flow graph that are associated with code portions which do not involve one or more predetermined variables (e.g., important variables).

The instructions may further cause the hardware processor to output the documentation. The documentation may be output in any of a variety of formats. For example, the documentation may be output as a text file and/or a webpage. Alternatively (or additionally), the documentation may be output to a user via a GUI.

Some aspects of the present disclosure relate to a system for generating a GUI to display documentation for a computer program. The documentation may comprise, for example, information gathered during execution of the computer program. Thereby, a user (e.g., a non-technical person) may gain a better understanding of how the computer program is executed. The system may comprise, for example, at least one hardware processor that coupled to at least one non-transitory computer-readable storage medium storing processor executable instructions that, when executed by the at least one hardware processor, cause the at least one hardware processor to perform various functions to generate a GUI for displaying documentation for a computer program. The instructions may cause the hardware processor to access source code of a computer program. The source code (and/or any associated executable code) may comprise instructions that cause the computer program to capture information during execution and store the information at a pre-determined location. Thereby, the computer program may make the information gathered during execution readily available. For example, the computer program may capture screenshots of a user interface of the computer program during execution and store the screenshots in a file. In another example where the computer program is a software robot, the software robot may capture screenshots of a user interface of another computer program being controlled by the software robot during execution and store the screenshot in a file. Alternatively (or additionally), the computer program may count a number of times code portions in the source code are executed and store the value in a file.

The instructions may further cause the hardware processor to generate information indicative of an execution flow of the computer program, such as a control flow graph and/or a business flow graph, at least in part by analyzing the source code. The information indicative of an execution flow of the computer program may be generated in any of a variety of ways using, for example, any of the techniques described herein. For example, ASTs may be generated for one or more software modules in the source code and relationships between the ASTs may be identified to generate an SIT. In this example, the SIT (and/or the ASTs) may be employed to generate the information indicative of the execution flow of the computer program.

The instructions may further cause the hardware processor to execute the computer program. The computer program may be executed by, for example, running executable code associated with the computer program. As discussed above, computer program may be configured to capture information during execution and store the captured information at a pre-determined location. The instructions may further cause the hardware processor to obtain this information gathered during execution of the computer program. For example, one or more files at a pre-determined storage location where the computer program stores the captured information may be read.

The instructions may further cause the hardware processor to generate a GUI using the information indicative of the execution flow and the information gathered during execution of the computer program. For example, the GUI may comprise a first view where a visualization of the execution flow of the computer program is presented. This visualization may be, for example, a rendering of a generated control flow graph and/or business flow graph. The visualization may comprise a plurality of GUI elements (e.g., nodes) that are each associated with a corresponding code portion in the source code. These nodes may be organized based on an order of execution of the code portions associated with the nodes. The GUI may transition from the first view to a second view upon selection of one of the nodes. The second view may comprise, for example, documentation for the code portion associated with the selected node. The documentation may comprise, for example, information gathered during execution of the computer program, such as a screenshot, and/or natural language text describing the logic implemented in the code portion.

Some aspects of the present disclosure relate to a system for modifying execution of a computer program based on user input received through a GUI. The GUI may comprise, for example, documentation for a computer program with a GUI element (e.g., a configurable field) that may be manipulated by a user (e.g., a non-technical individual). The system may modify execution of the computer program based on user input in a GUI element. The system may comprise, for example, at least one hardware processor that coupled to at least one non-transitory computer-readable storage medium storing processor executable instructions that, when executed by the at least one hardware processor, cause the at least one hardware processor to perform various functions to modify execution of a computer program based on user input received through a GUI. The instructions may cause the hardware processor to access the source code of a computer program and generate a GUI including documentation for the computer program. The documentation in the GUI may be generated manually (e.g., generated by a software engineer) and/or generated automatically based on the source code using any of a variety of techniques including any of the techniques described herein. The GUI may further include at least one GUI element for receiving user input to change execution of the computer program. The at least one GUI element may comprise, for example, a dropdown list, a radio button, a toggle button, a checkbox, a text field, and/or a slider.

The instructions may further cause the hardware processor to receive user input via the at least one GUI element. The user input may be, for example, manipulation of the GUI element by the user. The instructions may further cause the hardware processor to modify execution of the computer program based on the user input. The execution of the computer program may be modified in any of a variety of ways. For example, the source code may be modified based on the user input and converted into modified executable code (e.g., using a compiler and/or a linker). The modified executable code may then be executed in place of the original executable code. In another example, the executable code may read one or more values from a file at a predetermined location, such as values for one or more variables in computer program. In this example, the execution of the code may be modified by changing one or more values in the file that is read-in by the computer program.

It should be appreciated that the embodiments described herein may be implemented in any of numerous ways. Examples of specific implementations are provided below for illustrative purposes only. It should be appreciated that these embodiments and the features/capabilities provided may be used individually, all together, or in any combination of two or more, as aspects of the technology described herein are not limited in this respect.

Example LiveDoc System

FIG. 1 shows an example LiveDoc system 100 that is configured to generate software documentation for a computer program, such as a software robot. The LiveDoc system 100 accesses source code 104 and/or executable code 106 of a computer program to generate software documentation that may be presented to a user 120 via a GUI 122. The LiveDoc system 100 comprises a natural language conversion component 114 that generates natural language text that may be incorporated into the software documentation shown in the GUI 122 using the source code 104. A storage component 118 in the LiveDoc system 100 receives information from the executable code 106 at runtime, such as screenshots, video, and documents, that may be incorporated into the software documentation in the GUI 122. A configuration channel 116 in the LiveDoc system 100 is configured to make changes to the source code and/or the executable code based on manipulations of the GUI 122 by the user 120. Thereby, the user 120 may make changes to the source code by manipulating the GUI 122.

The source code 104 of a computer program may be, for example, a collection of computer instructions written in a programming language. The collection of computer instructions may be organized into one or more software modules. Each of the software modules may be a component of a computer program that comprises one or more software routines. The software modules may be stored separately in different computer files and/or stored together in a single computer file.

In some embodiments, the source code 104 may comprise comments. These comments may be, for example, annotations in the source code 104 that may be inserted by a software developer to make the source code easier to read and/or understand. The source code 104 may comprise multiple types of comments. For example, the source code 104 may comprise regular comments that are intended to only be read by other software developers who directly read the source code 104 and special comments that are intended to be incorporated into the software documentation generated by the LiveDoc system 100. Regular comments may be delineated from special comments by a marker, such as a unique sequence of characters, inserted into the source code 104. Thereby, the LiveDoc system 100 may easily extract the special comments from the source code for inclusion in the documentation.

The natural language conversion component 114 may be configured to generate documentation using the source code 104. The generated documentation may be, for example, displayed via the GUI 122. The natural language conversion component 114 may generate the documentation using the source code 104 in any of a variety of ways. In some embodiments, the natural language conversion component 114 is configured to identify an execution flow of the source code 104 and organize documentation using the identified execution flow of the source code 104. In these embodiments, the documentation itself may be extracted from the source code 104 and/or generated by converting one or more lines of code in the source code to natural language text. For example, the natural language conversion component 114 may extract special comments embedded in the source code 104 to include in the documentation. In another example, the natural language conversion component 114 may convert one or more lines of code in the source code 104 to natural language text by filling in variable names and/or values in template sentences for a set of predetermined constructs in the source code 104, such as software modules, function calls, function definitions, and/or assignment statements.

Figure 2:
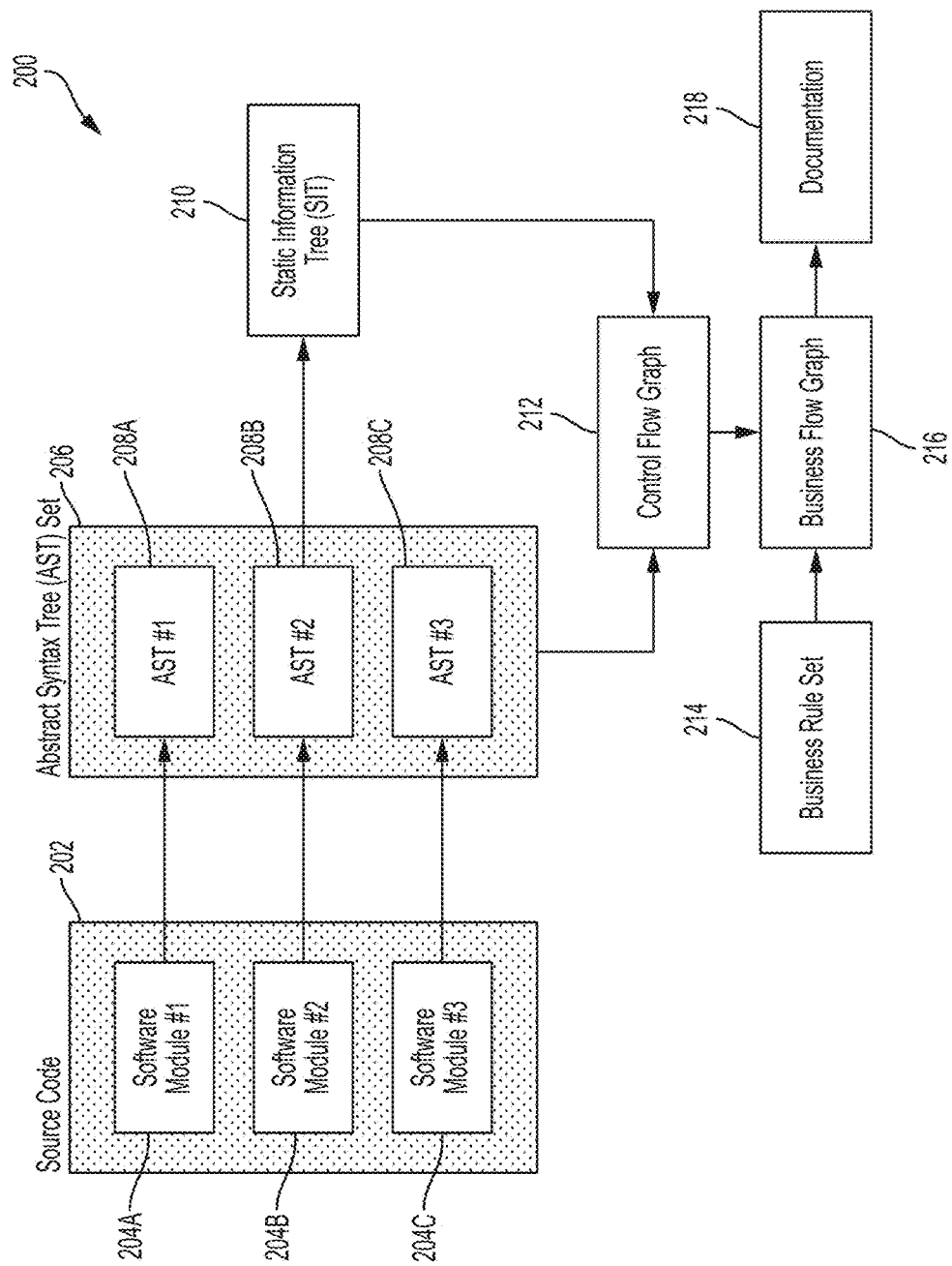
FIG. 2 is a diagram of an example process of generating documentation from source code, according to some embodiments of the technology described herein.

FIG. 2 shows an example process 200 that may be employed by the natural language conversion component 114 to generate documentation 218 based on source code 202. As shown, the source code 202 is sub-divided into a plurality of software modules 204A-204C with one or more software routines. The software modules 204A-204C may be stored together in a single file or stored separately across multiple files. The software modules 204A-204C may be parsed using, for example, a static source code parser (e.g., a recursive parser) to generate an AST set 206 comprising an AST for each of the software modules 204A-204C shown as ASTs 208A-208C. Any of a variety of static source code parsers may be employed such as those available through open source libraries (e.g., JAVAPARSER). The ASTs 208A-208C may be, for example, a tree representation of the abstract syntactic structure of the instructions contained in the software modules 204A-204C. The generated ASTs 208A-208C, however, may not contain information indicative of how the ASTs 208A-208C (and their corresponding software modules 204A-204C) are linked. For example, AST 208A (and thereby software module 204A) may comprise a function call to a function that is defined in a separate AST, such as AST 208B (and thereby software module 204B).

Accordingly, in some embodiments, the ASTs 208A-208C may be linked together to represent the relationships between the ASTs 208A-208C. The relationships between the ASTs 208A-208C may be identified in any of a variety of ways. In some embodiments, the SIT 210 may be formed by, for example, parsing of all the ASTs in the AST set 206. For example, the AST 208A may be analyzed to identify one or more function calls in the AST 208A that are not defined within the AST 208A. For each of these function calls, the other ASTs (e.g., ASTs 208B and 208C) may be searched to location the corresponding definitions. These relationships may be embodied in SIT 210.

The SIT 210 may comprise, for example, a plurality of nodes each representative of a construct in the source code 202 (such as a module, class, function and/or variable). Relationships between these nodes, such as parent-child relationships, may be represented by links between nodes. For example, a variable may be represented as a first node that is linked as a child to a second node associated with the software module in which the variable is defined. These relationships may be associated with nodes in the form of attributes. For example, an attribute for a given node may comprise a pointer to one or more parent nodes. In some embodiments, some types of nodes (such as nodes for functions or variables) may have different attributes than other types of nodes (such as nodes for classes). For example, the nodes for variables may comprise an attribute that is representative of the class of the variable. In another example, the nodes for functions may comprise an attribute that is representative of the class of the object that the function returns.

The SIT 210 may be employed alone or in combination with one or more ASTs in the AST set 206 to create a control flow graph 212 that is indicative of an execution flow of the source code 202. The control flow graph 212 may comprise a plurality of nodes that are each associated with a code portion of the source code 202 and a plurality of links (sometimes referred to as "edges") that connect the nodes. The code portions may be, for example, one or more lines of code from one or more software modules (e.g., software modules 204A-204C) in the source code 202. The links may be representative of an execution order of the code portions. The control flow graph 212 may be generated using any of a variety of techniques. In some embodiments, the control flow graph 212 may be generated by parsing the source code 202 using the SIT 210 (and/or ASTs 208A-208C) as a guide to indicate where constructs in the source code 202 are defined. For example, a code portion in the source code 202 may be encountered that employs a function call that is defined in another portion of the source code 202. In this example, the SIT 210 may be employed to locate the function definition and associate the function definition with the function call in the code portion.

As discussed above, the control flow graph 212 may comprise a plurality of nodes associated with a plurality of code portions in the source code 202. Some of these nodes may be for code portions that are related to the particular implementation of the process in the source code 202 instead of the high-level process. For example, the source code 202 may be for a software robot that is configured to process invoices for purchased goods by performing the following high-level process: (1) identifying the purchased goods listed on the invoice; (2) determining whether the purchased goods were received; and (3) paying the invoice if the purchased goods were received. A control flow graph for such a software robot may comprise nodes that directly relate to this high-level process (e.g., a node for a code portion that determines whether the goods received match the goods listed on the invoice) with nodes that are specific to the implementation (e.g., a node for a code portion that is a counter in a for-loop).

Accordingly, in some embodiments, the nodes for code portions related to the particular implementation of the process in the source code 202 may be separated from the nodes for code portions related to the high-level process. The nodes for code portions related to the high-level process may be identified using a business rule set 214. Business rule set 214 may comprise, for example, a plurality of rules that classify nodes as either implementation related or high-level process related. For example, a rule may specify that any node whose corresponding code portion comprises an important variable may be high-level process related. Thereby, the nodes related to the implementation may be removed from the control flow graph 212 to form a simplified control flow graph shown as business flow graph 216. For illustration, a software robot that is configured to process invoices may have an "invoice amount variable" identified as an important variable. Thereby, all of the nodes that employ the "invoice amount variable" may be deemed important nodes while other nodes (such as nodes that increment a counter) may be deemed unimportant and, thereby, removed.

The business flow graph 216 (and/or the control flow graph 212) may be employed to generate the documentation 218. For example, the business flow graph 216 (and/or the control flow graph 212) may be employed to create an index for the documentation 218. For example, one or more nodes in the business flow graph 216 (and/or the control flow graph 212) may become entries in the index. Thereby, the documentation 218 may be logically organized (e.g., by order of execution) to assist non-technical users to navigate the documentation. The documentation for a given node may comprise, for example, natural language text descriptive of the logic implemented in the code portion associated with the node.

In some embodiments, the documentation for a given node is directly extracted from the code portion. In these embodiments, the code portion may comprise special comments that are added to the code portion by, for example, a software engineer. These special comments may be marked in the code portion using a unique marker and/or flag to distinguish these special comments from regular comments not intended to be added to the documentation. Thereby, the special comments in a code portion may be easily extracted and incorporated into the documentation.

In some embodiments, the documentation for a given node is automatically generated through analysis of the source code (e.g., the code portion). For example, one or more lines of source code in a given code portion may converted to natural language text. The conversion to natural language text may be performed in any of a variety of ways. In some embodiments, template sentences may be created for various constructs in the source code, such as software modules, function calls, function definitions, and/or assignment statements. In these embodiments, the template sentences may be filled in using, for example, variable names and/or values recited in a given construct in the source code. For example, a template sentence for an assignment statement may be "Assign [INSERT VALUE] to [INSERT VARIABLE NAME]." In this example, the template sentence may be applied to the assignment statement "result=0" to yield the completed sentence "Assign 0 to result." In another example, a template sentence for a for loop statement may be "For every element in [INSERT LIST NAME] as [INSERT ELEMENT NAME] do the following." In this example, the template sentence may be applied to the for loop statement "for number in list_of_numbers:" to yield the completed sentence "For every element in list_of_numbers as number do the following:"

Figure 3:
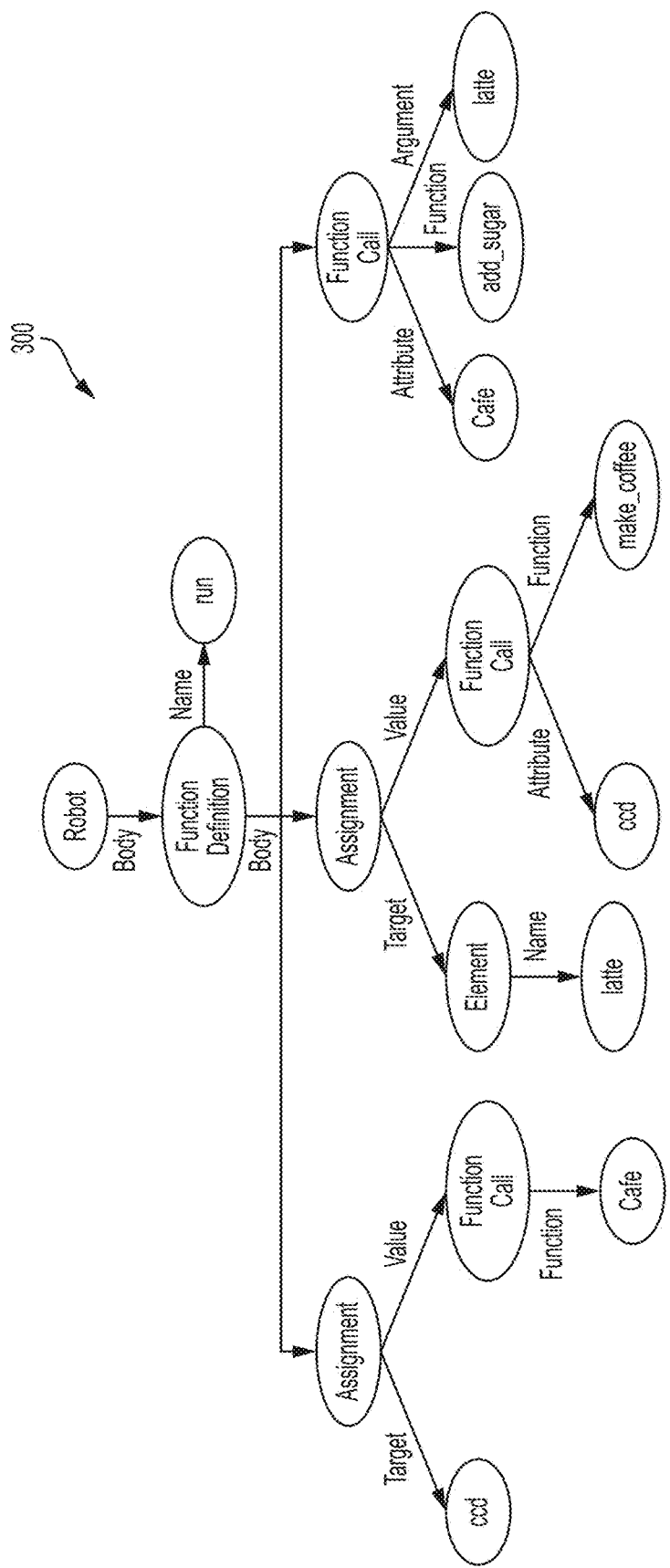
FIG. 3 is a diagram of an example abstract syntax tree (AST), according to some embodiments of the technology described herein.
Figure 4:
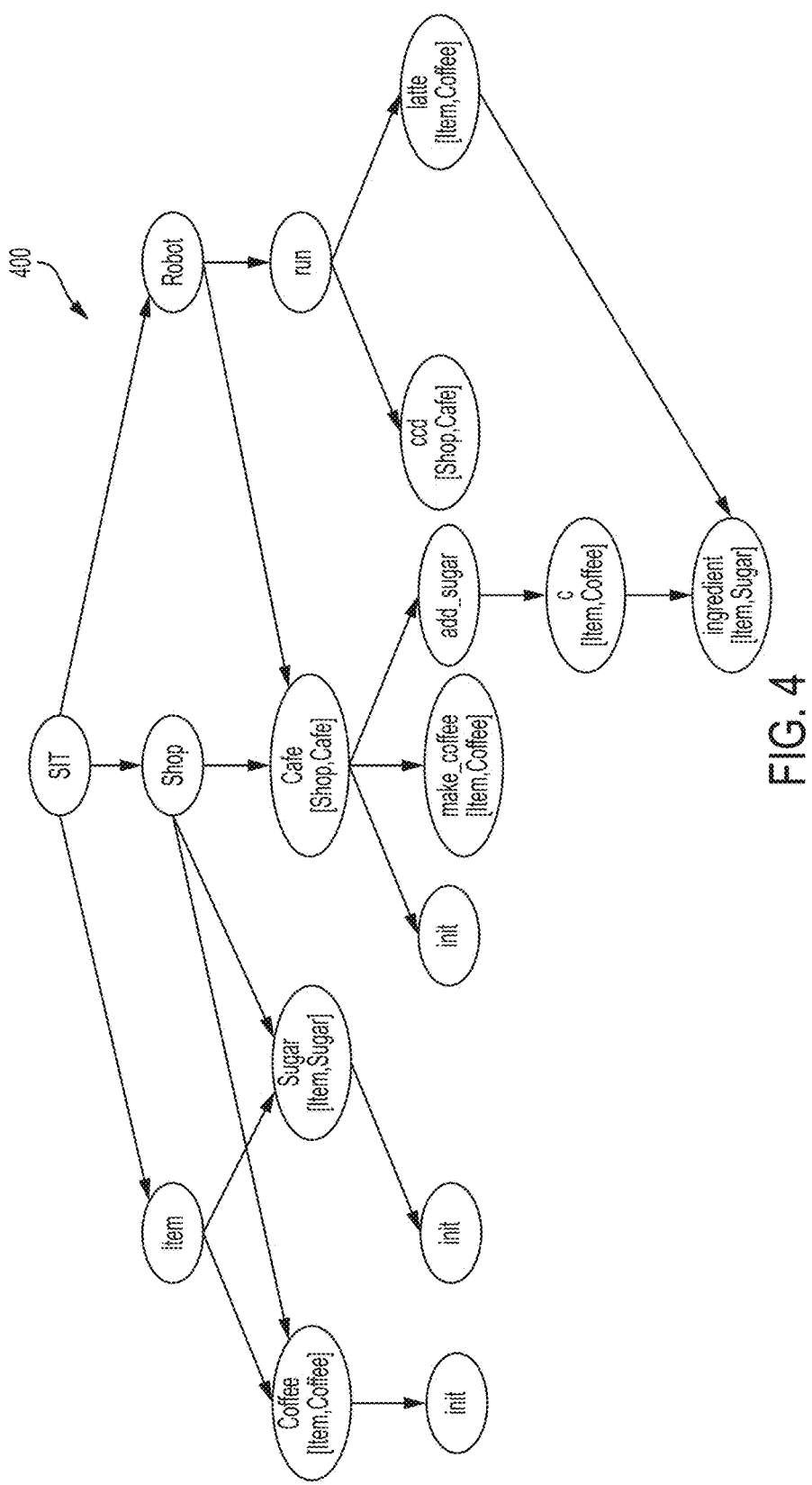
FIG. 4 is a diagram of an example static information tree (SIT), according to some embodiments of the technology described herein.
Figure 5:
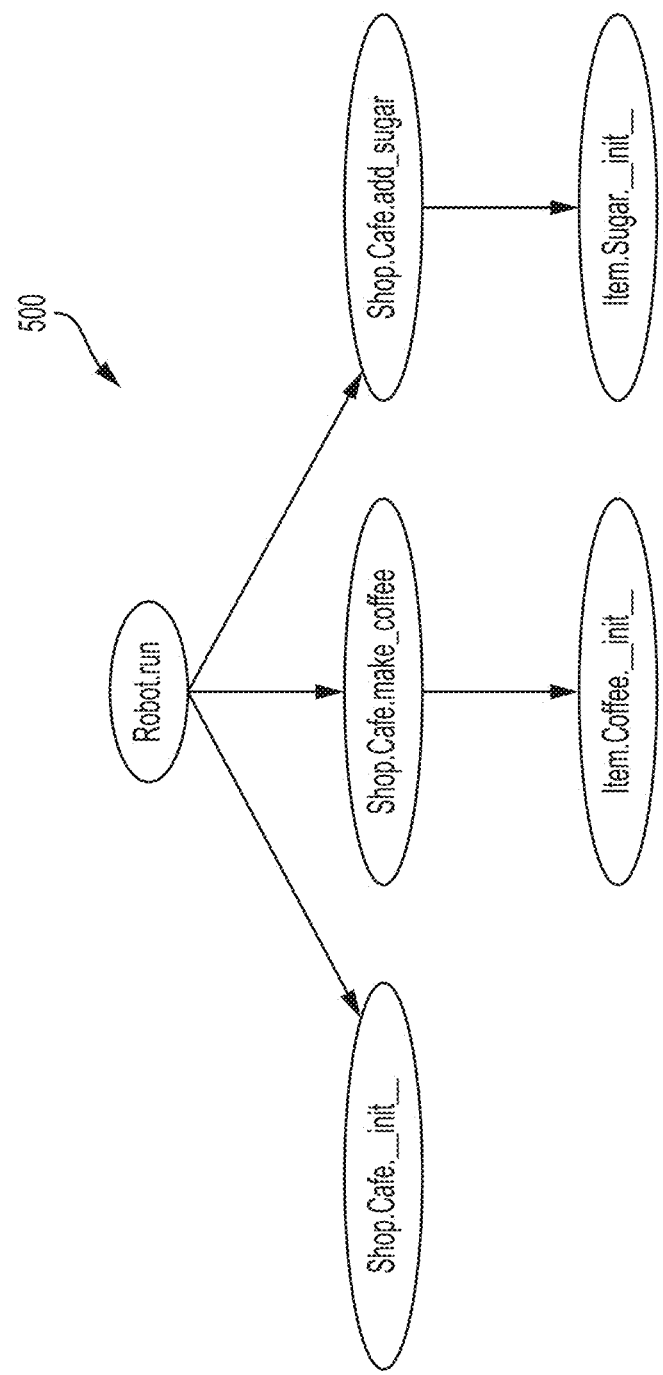
FIG. 5 is a diagram of an example control flow graph, according to some embodiments of the technology described herein.

For illustration, the steps of generating documentation for a computer program that triggers a software robot to: (1) start, (2) open a café, (3) make coffee in the café, (4) add sugar to the coffee, and (5) stop are shown in FIGS. 3-5. In particular, FIG. 3 shows an example AST for the computer program, FIG. 4 shows an example SIT for the computer program, and FIG. 5 shows an example control flow graph for the computer program. The computer program contains three software modules: (1) a Robot Module, (2) a Shop Module, and (3) an Item Module. An example implementation of the Robot Module in the Python programming language is shown below in Table 1:

TABLE 1

Example Code for Robot Module

| Line Number | Code |
|---|---|
| 1 | from Shop import Cafe |
| 2 | def run( ): |
| 3 |     docstring ("* Start robot.") |
| 4 |     ccd = Cafe( ) |
| 5 |     latte = ccd.make_coffee( ) |
| 6 |     Cafe.add_sugar(latte) |
| 7 |     docstring("* Stop robot.") |

As shown in Table 1, the Robot Module imports the class "cafe" from the Shop Module in line 1, defines a function "run" in line 2, initializes a new cafe object called "ccd" in line 4, makes coffee called "latte" from the "ccd" café object in line 5, and adds sugar to the coffee named "latte" in line 6. FIG. 3 shows an AST 300 for the Robot Module in Table 1. The AST 300 comprises a plurality of nodes (shown as ovals) that represent a construct in the code (e.g., a software module, a function call, a function definition, and/or an assignment statement) for the Robot Module that are interconnected by links (shown as arrows) that illustrate the relationships between constructs. As shown, the AST 300 for the Robot Module does not include all of the constructs for classes and/or functions defined outside the Robot Module, such as those classes and/or functions defined in the Shop Module and the Item Module. Accordingly, an SIT may be created that illustrates the relationships between the ASTs to form a more complete representation of the source code for the computer program.

An example implementation of the Shop Module in the Python programming language is shown below in Table 2:

TABLE 2

Example Code for Shop Module

| Line Number | Code |
|---|---|
| 1 | from Item import Coffee, Sugar: |
| 2 | class Cafe: |
| 3 |     def __init__(self): |
| 4 |         docstring ("* Open cafe.") |
| 5 |         pass |
| 6 |     def make_coffee(self) -> Coffee: |
| 7 |         coffee = Coffee( ) |
| 8 |         return coffee |
| 9 |     @staticmethod |
| 10 |     def add_sugar(c: Coffee) -> None: |
| 11 |         docstring ("* Add sugar.") |
| 12 |         c.ingredient = Sugar( ) |

As shown in Table 2, the Shop Module imports the classes "Coffee" and "Sugar" from the Item module in line 1 and defines a class "Café" in lines 2-12 including the function "make_coffee" in lines 6-8 and the function "add_sugar" in lines 10-12.

An example implementation of the Item Module in the Python programming language is shown below in Table 3:

TABLE 3

Example Code for Item Module

| Line Number | Code |
|---|---|
| 1 | class Coffee: |
| 2 |     def __init__(self): |
| 3 |         docstring ("* Make coffee.") |
| 4 |         pass |
| 5 | class Sugar: |
| 6 |     def __init__(self): |
| 7 |         pass |

As shown in Table 3, the Item Module defines the class "Coffee" in lines 1-4 and defines the class "Sugar" in lines 5-7.

As discussed above, the ASTs for the individual software modules may not represent relationships between the ASTs. Accordingly, an SIT may be formed that includes these relationships between ASTs. FIG. 4 shows an example SIT 400 for the computer program that is generated using the AST 300 for the Robot Module and ASTs for the Shop and Item Modules. The SIT 400 comprises a plurality of nodes (shown as ovals) that represent a construct in the code (e.g., a software module, a function call, a function definition, and/or an assignment statement) for the Robot Module that are interconnected by links (shown as arrows) that illustrate the relationships between constructs. Return paths in the SIT 400 are shown within square brackets and may be indicative of, for example, the location where a construct associated with a given node is defined. As shown, the nodes representing each of the "Coffee" and "Sugar" classes are children of both the Item Module and the Shop Module because the Item Module defines these classes and the Shop Module imports these classes. Similarly, the node representing the "Cafe" class is a child of both the Shop Module and the Robot Module because the Shop Module defines the class and the Robot Module imports the class. As may be appreciated from FIG. 4, the generated SIT 400 includes information about the class and scope of variables that is missing in the ASTs.

The SIT 400, along with the AST 300 for the Robot Module and/or ASTs for the Shop and Item modules, may be employed to generate the control flow graph 500 in FIG. 5 that is indicative of an execution flow of the computer program. As shown, the control flow graph 500 comprises a plurality of nodes each associated with a code portion from the source code. The arrows between nodes in the control flow graph 500 may be indicative of an order of execution of the code portions associated with the nodes.

The control flow graph 500 may be employed to create documentation for the computer program. For example, documentation in natural language text may be generated for each node in the control flow graph 500. Thereby, the control flow graph 500 may serve as an index to organize presentation of the documentation. The documentation may be generated using any of the techniques described herein. For example, the documentation may be extracted directly from comments (e.g., special comments) embedded in the code portions. Alternatively (or additionally), the documentation may be generated automatically by analyzing the code portions.

Returning to FIG. 1, the executable code 106 of the computer program may be, for example, a collection of machine instructions that may be executed by a computer system to run the computer program. The executable code 106 may be generated from the source code 104 using, for example, a compiler and/or a linker.

In some embodiments, the executable code 106 may comprise one or more machine instructions to capture and store data in the storage component 118 during execution. Thereby, information gathered during runtime of the executable code may be made available to the LiveDoc system 100 for incorporation into the documentation presented in the GUI 122 via the storage component 118. The executable code 106 may add a label to the information stored in the storage component 118 that provides an indication to the LiveDoc system 100 where and/or how the information should be incorporated into the GUI 122. For example, the executable code 106 may comprise instructions to take a screenshot of a GUI of the computer program at particular points in the code and store the captured screenshots in the storage component 118 with a label. In this example, the LiveDoc system 100 may be configured to use the label to identify where the screenshot is to be incorporated into the documentation. In another example, the executable code 106 may comprise instructions to count how many times particular code portions are executed and write the values for each code portion to a file with a label in the storage component 118. In this example, the LiveDoc system 100 may use the label to identify which code portion each of the values in the file correspond to and, thereby, how to employ the values in the GUI 118.

The configuration channel 116 may be configured to detect changes to one or more GUI elements (e.g., configurable fields) in the GUI 122 and make corresponding changes to the computer program (e.g., the source code 104 and/or the executable code 106). Thereby, the configuration channel 116 may function as a link between the GUI 122 and the source code 104 and/or the executable code 106. The configuration channel 116 may create this link using any of a variety of techniques. In some embodiments, a GUI element is incorporated into the GUI 122 that may be manipulated by the user 120. The GUI element may be, for example, a drop-down list, a radio button, a toggle button, a checkbox, a text field, and a slider. The GUI element may be associated with parameter in the computer program that may be altered. The configuration channel 116 may detect input by the user 120 into the GUI element and, responsive to detecting the user input, modify execution of the computer program.

In some embodiments, the configuration channel 116 may modify execution of the computer program without changing the source code 104. In these embodiments, the computer program may read one or more files to identify settings for parameters in the computer program. Thereby, the configuration channel 116 may modify execution of the computer program by modifying the files from which the computer program reads. For example, the computer program may read a table to identify values for one or more variables. In this example, the configuration channel 116 may modify entries in the table to modify execution of the computer program.

In some embodiments, the configuration channel 116 may modify execution of the computer program by directly manipulating the source code 104. In these embodiments, the configuration channel 116 may modify one or more lines of code in the source code 104 to generate modified source code. The configuration channel 116 may, then, convert the modified source code into modified executable code 106 (e.g., using a compiler and/or a linker). The configuration channel 116 may stop (or pause) execution of the executable code 106 and, in its place, execute the modified executable code.

Example Processes

Figure 6:
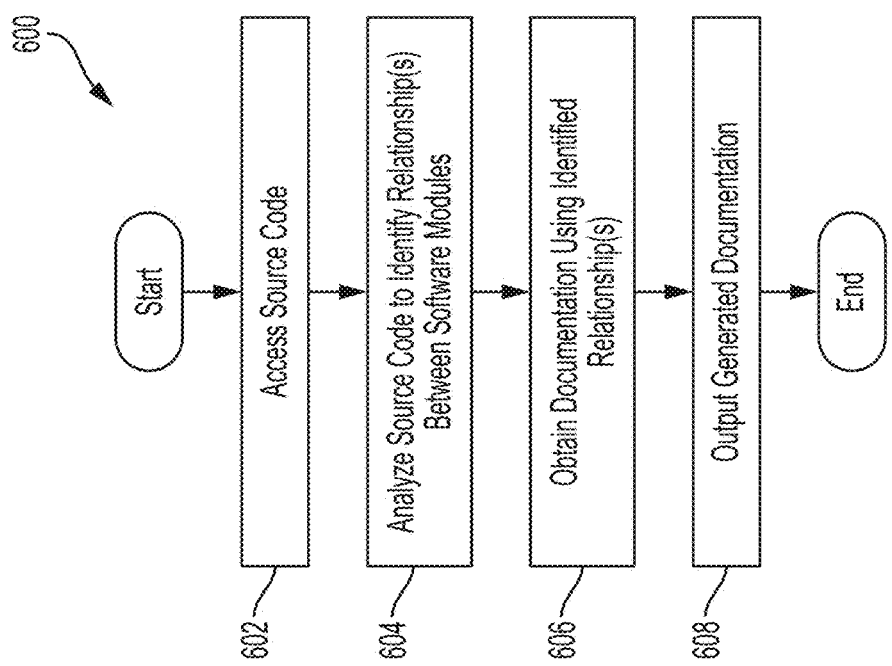
FIG. 6 is a flowchart of an example process for generating documentation for a computer program, according to some embodiments of the technology described herein.

As discussed above, the inventors have devised various techniques for creating documentation for computer programs, such as software robot computer programs. An example process to create such documentation for a computer program is shown in FIG. 6 by process 600. Process 600 may be performed by, for example, a computer system such as computer system 1100 described below. As shown, the process 600 includes an act 602 of accessing source code, an act 604 of analyzing the source code to identify relationships between software modules, an act 606 of obtaining documentation using the identified relationships, and an act 608 of outputting generated documentation.

In act 602, the system may access source code associated with a computer program. The source code may be, for example, sub-divided into a plurality of software modules. Each of these software modules may comprise, for example, instructions to perform one or more software routines. The software modules may be stored together in a single file or separated over a plurality of files on a non-transitory computer readable medium. The system may access the source code by, for example, accessing (and/or retrieving) the software modules from one or more files.

In act 604, the system may analyze the source code to identify relationship(s) between the software modules in the source code. The system may analyze the source code to identify relationships between software modules using any of a variety of techniques. In some embodiments, the system generates an AST for at least some of the software modules and parses the generated ASTs to identify relationships between constructs in the ASTs. These relationships may be represented in, for example, an SIT.

In act 606, the system may obtain documentation using the identified relationships. The system may obtain documentation by, for example, generating a control flow graph based on the identified relationships between software modules that is indicative of an execution flow of the computer program. The control flow graph may comprise, for example, a plurality of nodes each representative of a code portion (e.g., a code snippet) from the source code and a plurality of links that connect the code portions to show one or more execution paths. The control flow graph may be employed to create an index for the software documentation. For example, the system may obtain software documentation for each node and organize the obtained documentation in the same fashion as the control flow graph. The system may obtain the software documentation for each node in any of a variety of ways. For example, the system may directly obtain the software documentation from comments (e.g., special comments) embedded in the code portion associated with the node. In another example, the system may generate the software documentation by converting one or more lines of code in the code portion associated with the node into natural language text.

It should be appreciated that the system may obtain software documentation for only a portion of the nodes in the control flow graph. In some embodiments, the system may generate a business flow graph that only comprises certain nodes from the control flow graph that have one or more predetermined characteristics. Thereby, nodes that are specific to the particular implementation of a higher-level process in the source code may be separated from nodes that are part of the high-level process. For example, the business flow graph may only comprise nodes from the control flow graph that involve a particular set of variables.

In act 608, the system may output the generated documentation. The system may output the generated documentation in any of a variety of formats. For example, the system may output the generated documentation as a text file and/or a webpage.

Figure 7:
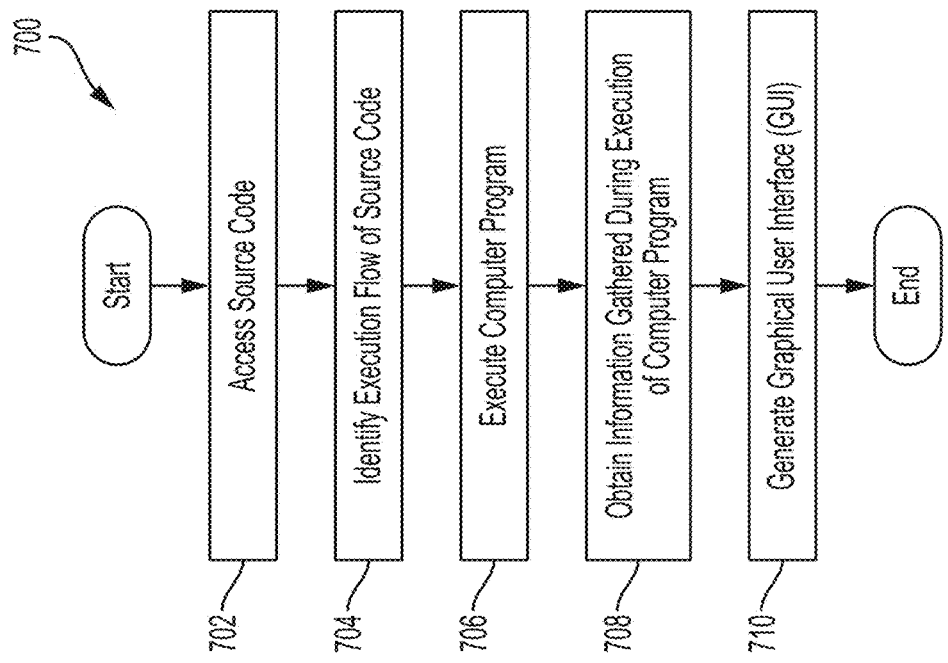
FIG. 7 is a flowchart of an example process for generating a graphical user interface (GUI) to display documentation for a computer program, according to some embodiments of the technology described herein.

In some embodiments, the generated software documentation may be presented to a user via a GUI. For example, a GUI may be presented to a user (e.g., via a web-browser) that illustrates at least part of the logic implemented in the source code using, for example, graphics and/or natural language text. Additionally (or alternatively), information gathered during execution of the computer program, such as screenshots, may be incorporated into the GUI to further assist a user to understand the computer program. An example process to generate a graphical user interface (GUI) to display documentation for a computer program is shown in FIG. 7 by process 700. Process 700 may be performed by, for example, a computer system such as computer system 1100 described below. As shown, the process 700 includes an act 702 of accessing source code, an act 704 of identifying an execution flow of the source code, an act 706 of executing the computer program, an act 708 of obtaining information gathered during execution of the computer program, and an act 710 of generating a GUI.

In act 702, the system may access source code associated with a computer program. The source code may be, for example, sub-divided into a plurality of software modules. Each of these software modules may comprise, for example, instructions to perform one or more software routines. The software modules may be stored together in a single file or separated over a plurality of files on a non-transitory computer readable medium. The system may access the source code by, for example, accessing (and/or retrieving) the software modules from one or more files.

In act 704, the system may identify an execution flow of the source code. The system may identify the execution flow of the source code using any of a variety of techniques described herein. For example, the system may identify the execution flow of the source code by generating a control flow graph and/or a business flow graph of the source code.

In act 706, the system may execute the computer program. The system may execute the computer program by, for example, running the executable code associated with the computer program. The executable code associated with the computer program may comprise, for example, one or more instructions to output information during execution. For example, the executable code may comprise instructions to count a number of times particular code portions (e.g., code portions associated with nodes in a control flow graph or a business flow graph) are executed.

In act 708, the system may obtain information gathered during execution of the computer program. The system may obtain the information gathered during execution of the computer program by reading files stored in a pre-determined location. For example, the system may read a file comprising values indicative of how many times one or more code portions of the source code have been executed.

In act 710, the system may generate a GUI using the identified execution flow and/or the obtained information. For example, a visual representation of the execution flow may be shown in the GUI by a plurality of elements (e.g., nodes) that are each associated with a code portion of the source code. These elements may be connected by links that illustrate how the code portions are traversed during execution. In this example, the GUI may transition from a first view showing a visual representation of the execution flow to a second view that shows software documentation for a particular node responsive to selection of a node. An example implementation of such a GUI is described in more detail below with reference to FIGS. 9A-9B.

In some embodiments, the visual representation of the execution may be generated based on the information obtained during execution of the computer program. In these embodiments, one or more characteristics (e.g., color, shape, and/or size) of one or more GUI elements in the visual representation of the execution flow (e.g., nodes and/or links) may be changed based on the information obtained. For example, a size of the links between two nodes may be modified based on the number of times the computer program executed both code portions associated with the link (e.g., the number of times the computer program traversed the link during execution).

Figure 8:
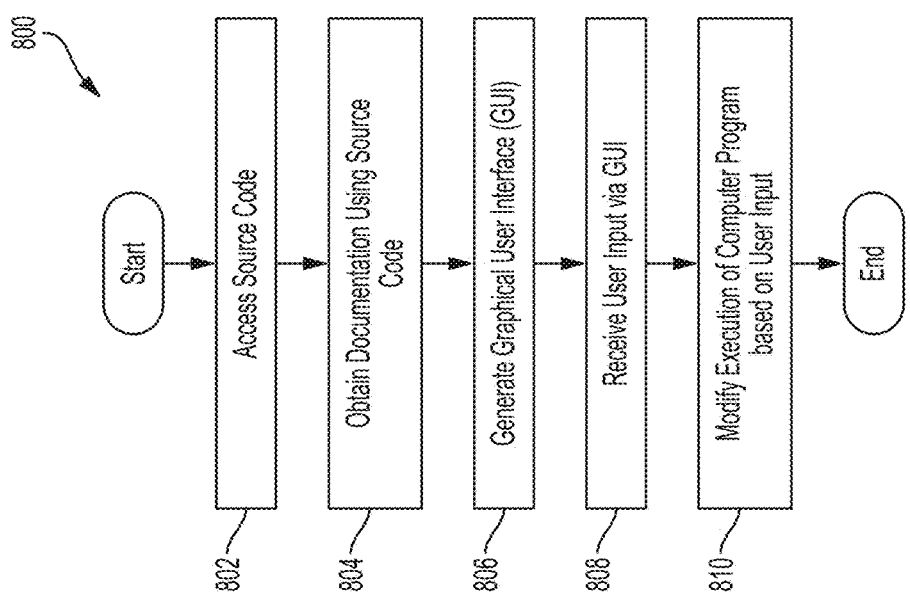
FIG. 8 is a flowchart of an example process for modifying execution of a computer program based on user input received through a GUI, according to some embodiments of the technology described herein.

In some embodiments, the generated documentation may permit a user to manipulate one or more characteristics of how the computer program executes. For example, the generated documentation may be provided in a GUI to a user and include a GUI element (e.g., a configurable field) that may be changed by the user. In this example, a change to a value in the GUI element may trigger a change to the underlying source code. An example process to configure execution of a computer program through a GUI is shown in FIG. 8 by process 800. Process 800 may be performed by, for example, a computer system such as computer system 1100 described below. As shown, the process 800 includes an act 802 of accessing source code, an act 804 of obtaining documentation using the source code, an act 806 of generating a GUI, an act 808 of receiving user input via the GUI, and an act 810 of modifying execution of the computer program based on the user input.

In act 802, the system may access source code associated with a computer program. The source code may be, for example, sub-divided into a plurality of software modules. Each of these software modules may comprise, for example, instructions to perform one or more software routines. The software modules may be stored together in a single file or separated over a plurality of files on a non-transitory computer readable medium. The system may access the source code by, for example, accessing (and/or retrieving) the software modules from one or more files.

In act 804, the system may obtain documentation using the source code. The system may obtain documentation using any of a variety of techniques described herein. For example, the system may extract the software documentation directly from comments (e.g., special comments) in the source code. In another example, the system may convert one or more portions of the source code into natural language text.

In act 806, the system may generate a GUI that comprises the software documentation. In some embodiments, the GUI may comprise a GUI element configured to receive user input (e.g., a configurable field) embedded in the software documentation. The configurable field may be, for example, a drop-down list, a radio button, a toggle button, a checkbox, a text field, and a slider. The GUI element may be associated with, for example, a configurable parameter in the computer program such as a variable.

In act 808, the system may receive user input via the GUI. The user input may comprise, for example, a change to the GUI element in the GUI.

In act 810, the system may modify execution of the computer program based on the user input. The system may modify execution of the computer program in any of a variety of ways. In some embodiments, the system may modify execution of the computer program by modifying a file that is read by the computer program during execution. For example, the computer program may read a table to identify values for one or more variables. In this example, the system may change the values for the one or more variables in the table to modify execution of the computer program. In other embodiments, the system may modify execution of the computer program by changing the source code for the computer program. For example, the system may change one or more lines of the source code associated with a parameter that was manipulated in the GUI. The system may use the modified source code to generate new executable code using, for example, a compiler and/or a linker. In another example, the system may generate modified source code by notifying (e.g., send an e-mail, adding a change code request to a queue, etc.) one or more human users (e.g., software engineers).

Various inventive concepts may be embodied as one or more processes, of which examples have been provided. The acts performed as part of each process may be ordered in any suitable way. Thus, embodiments may be constructed in which acts are performed in an order different than illustrated, which may include performing some acts simultaneously, even though shown as sequential acts in illustrative embodiments.

Example User Interfaces

Figure 9A:
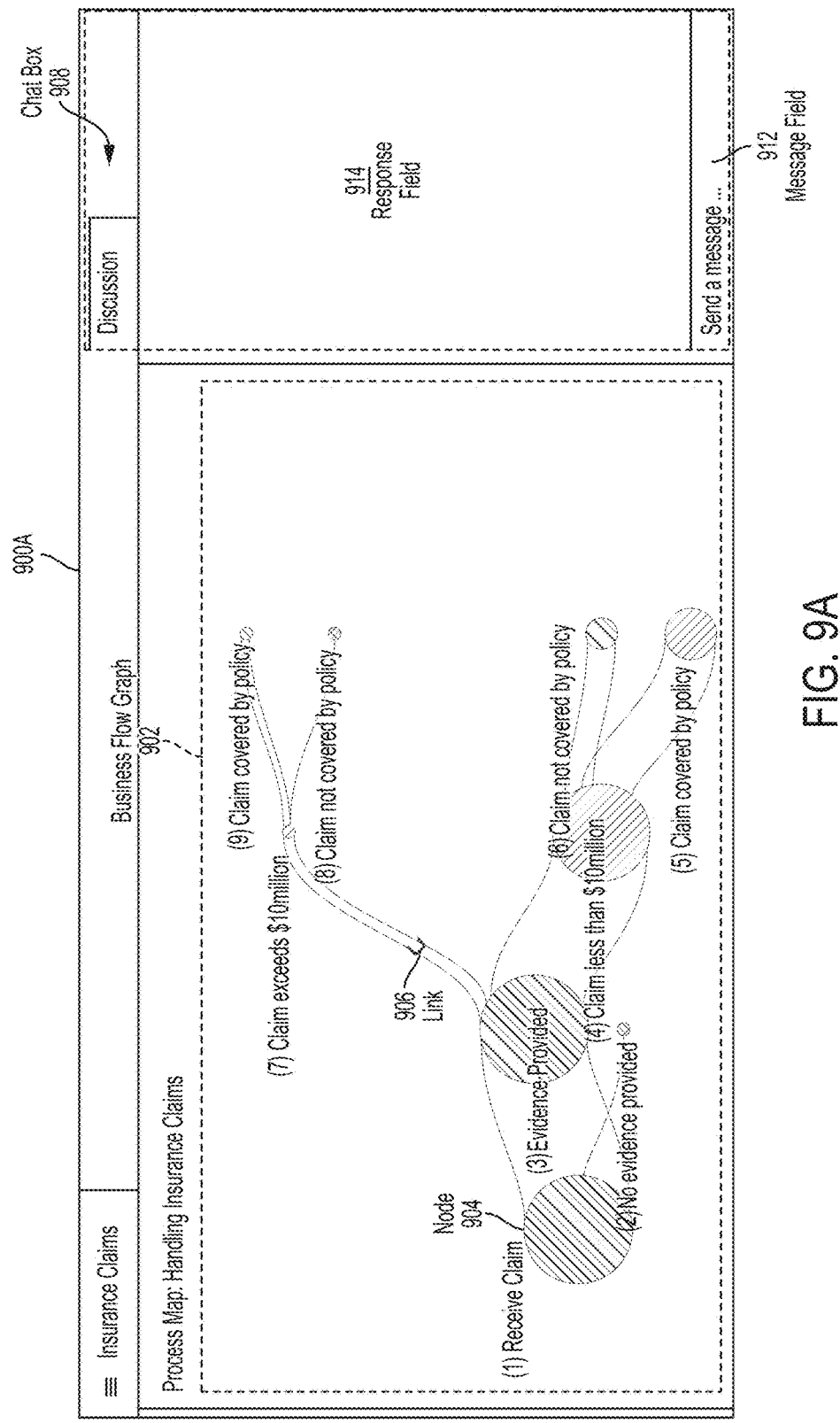
FIGS. 9A-9B are diagrams of an example user interface, according to some embodiments of the technology described herein.
Figure 9B:
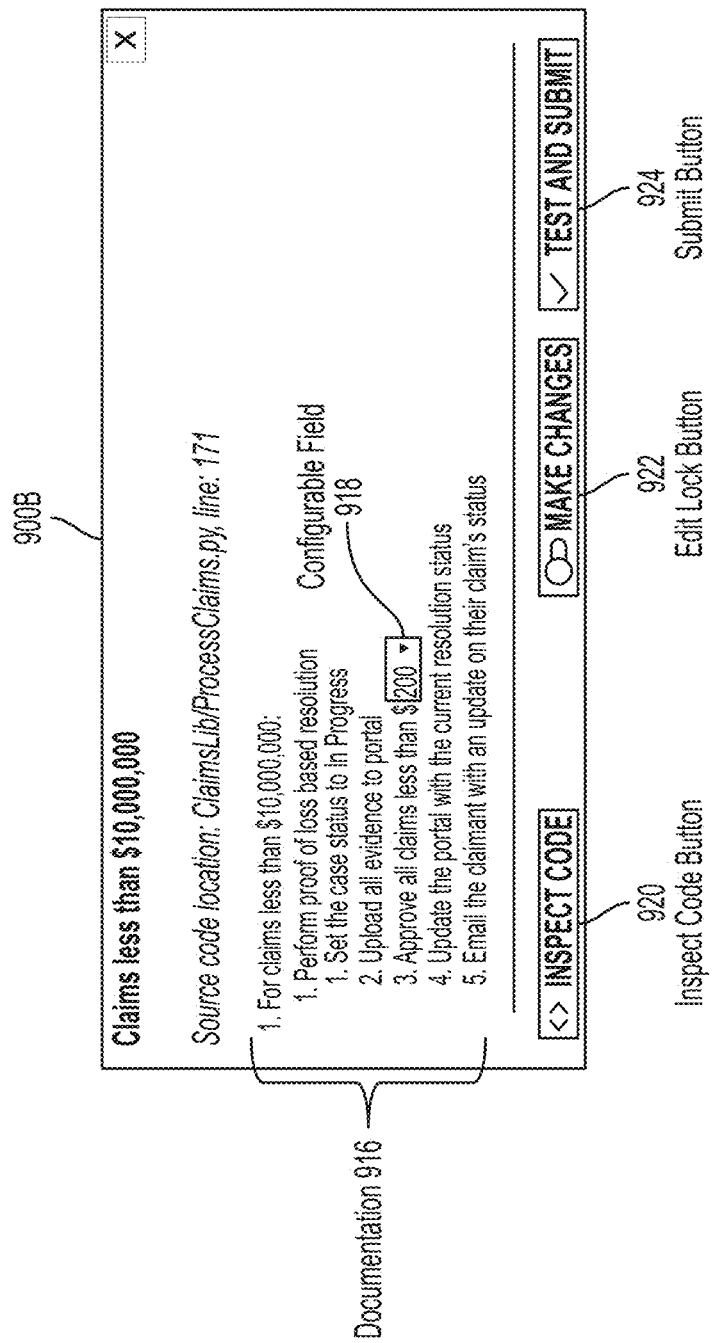

As discussed above, the generated software documentation for a computer program may be provided to a user through a GUI. Further, the GUI may be configured to permit a user to change a value in one or more configurable field to change execution of the source code. FIGS. 9A-9B show an example of such a GUI comprising a first view 900A and a second view 900B to show the software documentation generated for a software robot that is configured to control one or more other applications to process an insurance claim. As shown, the first view comprises a business flow graph 902 that illustrates the business logic implemented in the source code of the software robot through a plurality of nodes 904. The business logic implemented in the particular software robot comprises the following nodes 904: (1) receive insurance claim; (2) no evidence provided to establish a loss; (3) evidence provided establish a loss; (4) insurance claim value is less than $10 million; (5) insurance claim is not covered by the insurance policy; (6) insurance claim is covered by insurance policy; (7) insurance claim value exceeds $10 million; (8) insurance claim is not covered by insurance policy; (9) insurance claim is covered by insurance policy. The nodes 904 may be depicted in the first view 900A as, for example, a particular symbol (e.g., a circle, a square, a rectangle, and/or a star). The nodes 904 are interconnected by links 906 to show how the computer program traverses the various nodes in the business flow graph 902.

The depiction of the nodes 904 and/or the links 906 in the business flow graph 902 may change in accordance with one or more characteristics of execution of the computer program. For example, the size, color, and/or shape of the nodes 904 and/or links 906 may be changed. In some embodiments, the size of the links 906 may be proportional to a number of times the particular link is traversed by the computer program. In this example, links 906 between nodes 904 that are commonly traversed may be larger (e.g., wider) than other links 906 in the business flow graph. Additionally (and/or alternatively), a color of a given node 906 may change based on a number of times the computer program successfully executes one or more lines of code associated with the respective node. This information may be captured by, for example, inserting instructions into the computer program to count how many times code portions associated with each of the nodes 904 are executed (and/or executed successfully) and store these values in a file. Thereby, these values may be subsequently read and employed to modify one or more characteristics of the business flow graph 902.

The first view 900A may include additional information separate and apart from the business flow graph 902. For example, the first view 900A may also include a chat box 908 that is configured to receive messages (e.g., questions) from a user in a message field 912 and provide automated responses to the received messages in the response field 914. The chat box 908 may be configured to respond to, for example, a set of one or more pre-determined questions relating to one or more nodes 904 and/or links 906 in the business flow graph 902 such as "How many times has the Claim exceeds $10 million node has been reached during execution?"

In some embodiments, the GUI shown in FIGS. 9A and 9B may transition from the first view 900A to the second view 900B responsive to selection of a node 906 in the business flow graph 902. The second view 900B may include, for example, software documentation in natural language text for a code portion associated with the selected node. For example, documentation associated with the node "(4) for claims less than $10 million" may be shown responsive to selection (e.g., selection by a user) of the respective node. As shown in FIG. 9B, the second view comprises documentation 916 regarding the code portion associated with the selected node. The documentation 916 may comprise, for example, natural language text regarding the logic implemented in the associated code portion from the source code. The second view 900B further comprises a configurable field 918 in the documentation 916. The configurable field 918 may be, for example, a field comprising a value that may be configured by a user to modify execution of the computer program. The configurable field 918 may be implemented in any of a variety of ways such as: a drop-down list, a radio button, a toggle button, a checkbox, a text field, and a slider. The second view further comprises an inspect code button 920 that, upon activation, triggers the GUI to display the code portion associated with the selected node (e.g., via an integrated development environment (IDE)), an edit lock button 922 that, upon activation, triggers the GUI to lock the configurable field 918, and a submit button 924 that, upon activation, that modifies execution of the computer program using the value in the configurable field 918.

Figure 10A:
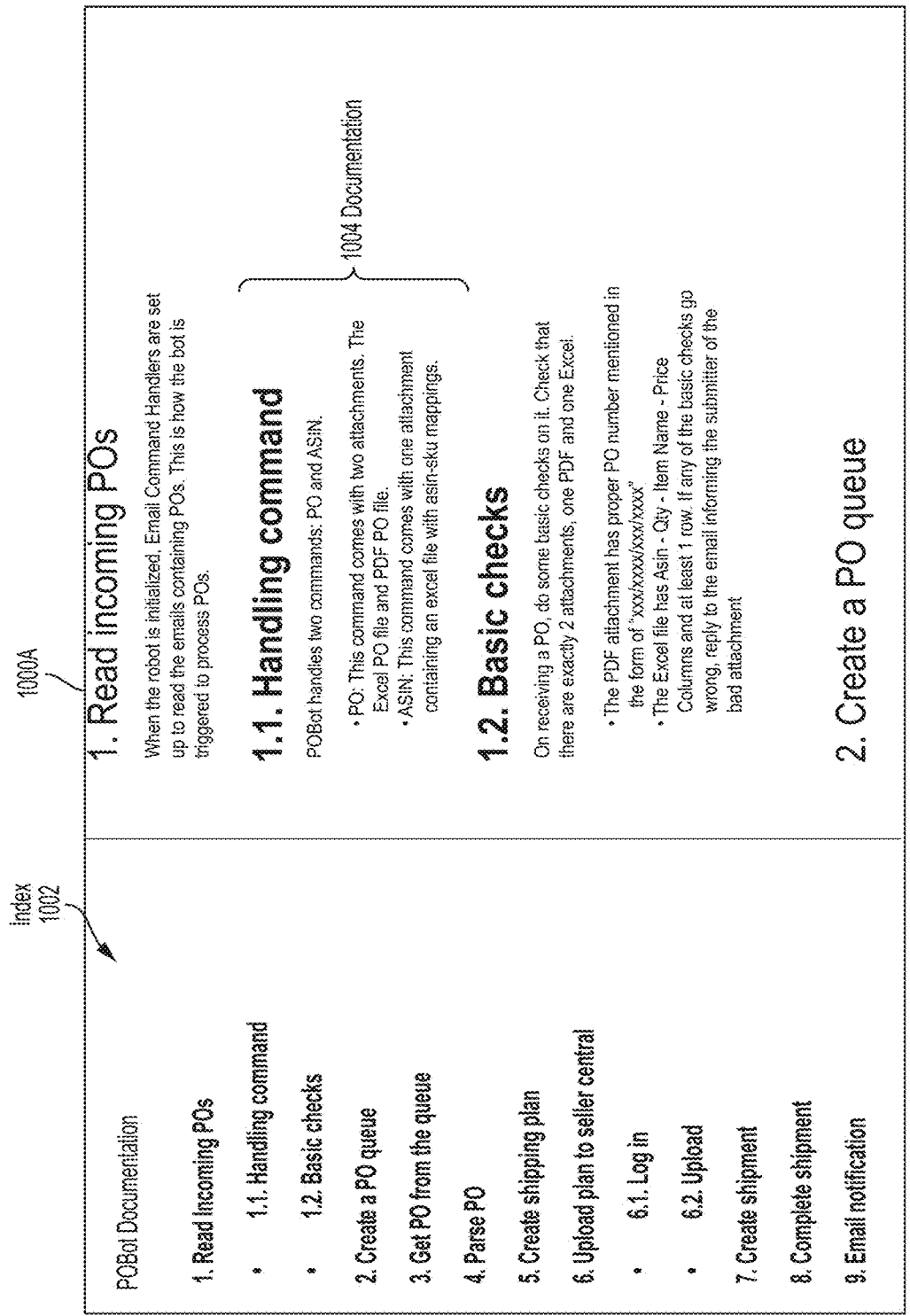
FIGS. 10A-10C are diagrams of another example user interface, according to some embodiments of the technology described herein.
Figure 10B:
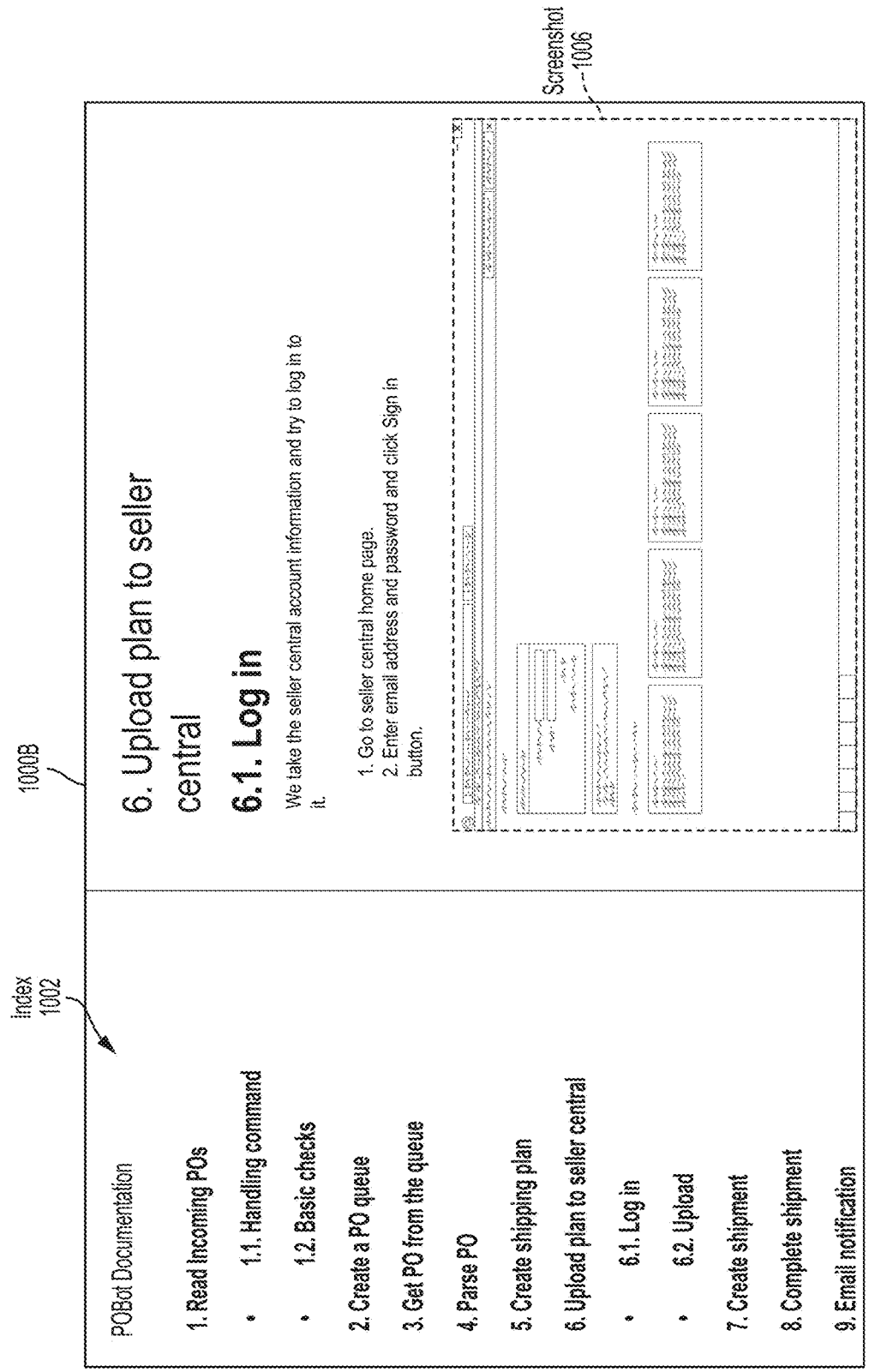
Figure 10C:
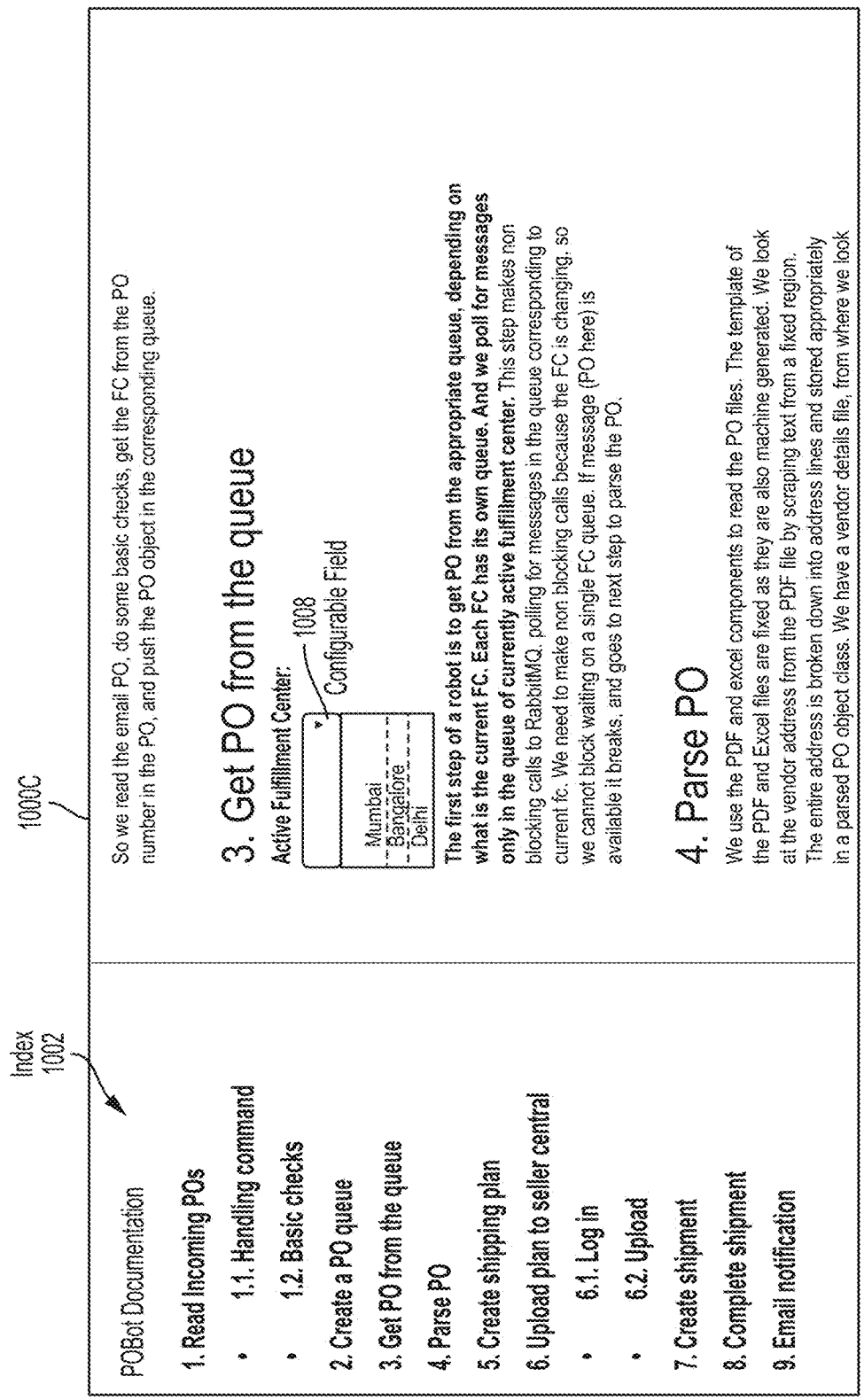

FIGS. 10A-10C illustrate another example of a GUI configured to display software documentation for a computer program. As shown, the GUI comprises a first view 1000A, a second view 1000B, and a third view 1000C that show documentation for a software robot computer program configured to process POs. Each of the views 1000A-C comprises an index 1002 that is configured to permit a user to navigate between various sections of the documentation. The index 1002 may comprises a plurality of links to different portions of the documentation. For example, the GUI may transition to section 2 "Create a PO queue" of the software documentation upon selection of the "Create a PO queue" link in the index 1002. The first view 1000A shows an example view for the "Read income POs" section with documentation 1004 that comprises natural language test. The second view 1000B shows an example view for the "Upload plan to seller central" section that comprises a screenshot 1006 of a user interface shown by the computer program during execution of a code portion associated with this section. The third view 1000C shows an example view for the "Get PO from the Queue" section that comprises a configurable field 1008 that permits a user (e.g., a non-technical individual) to easily change the fulfillment center (e.g., between Mumbai, Bangalore, and Delhi) used by the computer program in obtaining a PO from a queue.

Example Computer System

Figure 11:
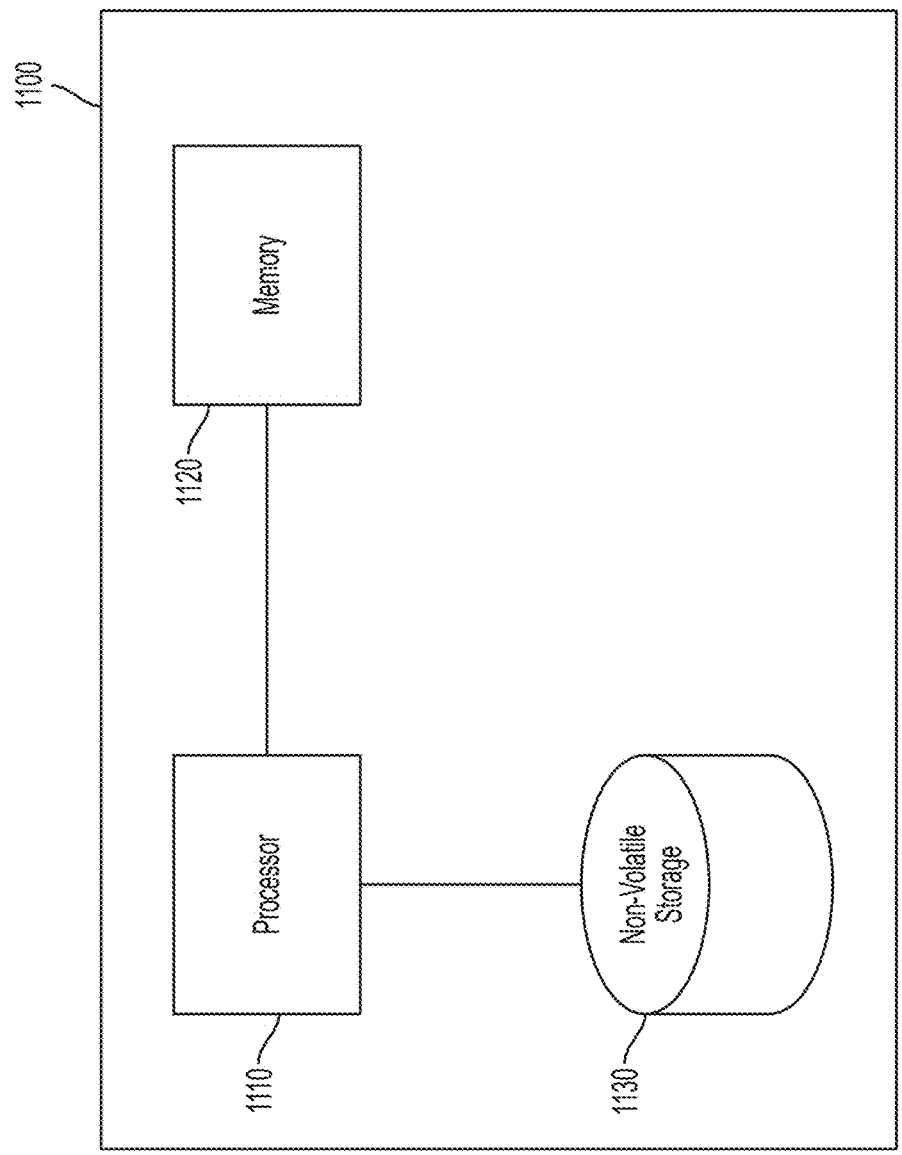
FIG. 11 is a block diagram of an example computer system, according to some embodiments of the technology described herein.

An illustrative implementation of a computer system 1100 that may be used in connection with any of the embodiments of the disclosure provided herein is shown in FIG. 11. For example, the LiveDoc system 100 may be implemented on and/or using computer system 1100. The computer system 1100 may include one or more processors 1110 and one or more articles of manufacture that comprise non-transitory computer-readable storage media (e.g., memory 1120 and one or more non-volatile storage media 1130). The processor 1110 may control writing data to and reading data from the memory 1120 and the non-volatile storage device 1130 in any suitable manner, as the aspects of the disclosure provided herein are not limited in this respect. To perform any of the functionality described herein, the processor 1110 may execute one or more processor-executable instructions stored in one or more non-transitory computer-readable storage media (e.g., the memory 1120), which may serve as non-transitory computer-readable storage media storing processor-executable instructions for execution by the processor 1110.

The terms "program" or "software" are used herein in a generic sense to refer to any type of computer code or set of processor-executable instructions that can be employed to program a computer or other processor to implement various aspects of embodiments as discussed above. Additionally, it should be appreciated that according to one aspect, one or more computer programs that when executed perform methods of the disclosure provided herein need not reside on a single computer or processor, but may be distributed in a modular fashion among different computers or processors to implement various aspects of the disclosure provided herein.

Processor-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Also, data structures may be stored in one or more non-transitory computer-readable storage media in any suitable form. For simplicity of illustration, data structures may be shown to have fields that are related through location in the data structure. Such relationships may likewise be achieved by assigning storage for the fields with locations in a non-transitory computer-readable medium that convey relationship between the fields. However, any suitable mechanism may be used to establish relationships among information in fields of a data structure, including through the use of pointers, tags or other mechanisms that establish relationships among data elements.

Also, various inventive concepts may be embodied as one or more processes, of which examples have been provided. The acts performed as part of each process may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, and/or ordinary meanings of the defined terms.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

Use of ordinal terms such as "first," "second," "third," etc., in the claims to modify a claim element does not by itself connote any priority, precedence, or order of one claim element over another or the temporal order in which acts of a method are performed. Such terms are used merely as labels to distinguish one claim element having a certain name from another element having a same name (but for use of the ordinal term).

The phraseology and terminology used herein is for the purpose of description and should not be regarded as limiting. The use of "including," "comprising," "having," "containing", "involving", and variations thereof, is meant to encompass the items listed thereafter and additional items.

Having described several embodiments of the techniques described herein in detail, various modifications, and improvements will readily occur to those skilled in the art. Such modifications and improvements are intended to be within the spirit and scope of the disclosure. Accordingly, the foregoing description is by way of example only, and is not intended as limiting. The techniques are limited only as defined by the following claims and the equivalents thereto.

What is claimed is:

1. A system, comprising:
at least one hardware processor; and
at least one non-transitory computer-readable storage medium storing processor executable instructions that, when executed by the at least one hardware processor, cause the at least one hardware processor to perform:

generating information indicative of execution flow of a computer program at least in part by analyzing source code of the computer program;

executing the computer program;

obtaining information gathered during execution of the computer program; and generating a graphical user interface (GUI) for documenting the computer program using the information indicative of the execution flow and the information gathered during execution of the computer program, the generating comprising:

generating a first graph based on the execution flow of the computer program, the first graph comprising a first plurality of nodes associated with code portions in the source code, generating a second graph from the first graph at least in part by:

determining whether to remove a first node of the first plurality of nodes in the first graph, wherein determining whether to remove the first node comprises:

determining whether the first node is associated with a code portion that includes a variable indicated by one or more business rules, and removing the first node from the first graph to generate the second graph comprising a second plurality of nodes when the first node is not associated with the code portion that includes the variable indicated by the one or more business rules, and generating a visualization of the second graph, the visualization comprising a plurality of GUI elements, each of which is associated with a corresponding node of the second plurality of nodes of the second graph, wherein the plurality of GUI elements are organized based on an order of execution of the code portions associated with the corresponding nodes of the second graph.

2. The system of claim 1, wherein obtaining the information gathered during execution of the computer program comprises obtaining at least one of: an image, a video, or a text file generated during execution of the computer program.

3. The system of claim 1, wherein generating the GUI comprises modifying a characteristic of at least one GUI element of the plurality of GUI elements based on the information gathered during execution of the computer program.

4. The system of claim 3, wherein the characteristic of the at least one GUI element comprises at least one characteristic selected from the group consisting of: a size, a shape, and a color.

5. The system of claim 1, wherein the visualization comprises a link between at least two GUI elements of the plurality of GUI elements representative of a relationship between the corresponding code portions associated with the at least two GUI elements.

6. The system of claim 5, wherein generating the GUI comprises modifying a characteristic of the link based on the information gathered during execution of the computer program.

7. The system of claim 6, wherein the characteristic of the link comprises at least one characteristic selected from the group consisting of: a size, a shape, and a color.

8. The system of claim 1, wherein the processor executable instructions further cause the at least one processor to perform:

transitioning the GUI from a first view comprising the visualization to a second view upon selection of at least one GUI element of the plurality of GUI elements.

9. The system of claim 8, wherein the second view comprises documentation for the corresponding code portion associated with the selected at least one GUI element.

10. The system of claim 9, wherein the documentation comprises natural language text.

11. The system of claim 1, wherein the computer program is configured to control another computer program to perform a task.

12. The system of claim 11, wherein the computer program is configured to control the other computer program to perform the task at least in part by controlling a graphical user interface (GUI) of the other computer program to perform an action in furtherance of the task.

13. The system of claim 1, wherein each of the first plurality of nodes of the first graph is associated with a corresponding code portion in the source code of the computer program.

14. The system of claim 1, wherein determining whether to remove the first node further comprises:

retaining a second node from the first graph when the second node is associated with the code portion that includes the variable indicated by the one or more business rules, wherein the second plurality of nodes includes the retained second node.

15. A method, comprising:

using at least one hardware processor to perform:

generating information indicative of execution flow of a computer program at least in part by analyzing source code of the computer program;

executing the computer program;

obtaining information gathered during execution of the computer program; and generating a graphical user interface (GUI) for documenting the computer program using the information indicative of the execution flow and the information gathered during execution of the computer program, the generating comprising:

generating a first graph based on the execution flow of the computer program, the first graph comprising a first plurality of nodes associated with code portions in the source code, generating a second graph from the first graph at least in part by:

determining whether to remove a first node of the first plurality of nodes in the first graph, wherein determining whether to remove the first node comprises:

determining whether the first node is associated with a code portion that includes a variable indicated by one or more business rules, and removing the first node from the first graph to generate the second graph comprising a second plurality of nodes when the first node is not associated with the code portion that includes the variable indicated by the one or more business rules, and generating a visualization of the second graph, the visualization comprising a plurality of GUI elements, each of which is associated with a corresponding node of the second plurality of nodes of the second graph, wherein the plurality of GUI elements are organized based on an order of execution of the code portions associated with the corresponding nodes of the second graph.

16. The method of claim 15, wherein obtaining the information gathered during execution of the computer program comprises obtaining at least one of: an image, a video, or a text file generated during execution of the computer program.

17. The method of claim 15, wherein generating the GUI comprises modifying a characteristic of at least one GUI element of the plurality of GUI elements based on the information gathered during execution of the computer program.

18. The method of claim 17, wherein the characteristic of the at least one GUI element comprises at least one characteristic selected from the group consisting of: a size, a shape, and a color.

19. The method of claim 15, wherein the visualization comprises a link between at least two GUI elements of the plurality of GUI elements representative of a relationship between the corresponding code portions associated with the at least two GUI elements.

20. The method of claim 19, wherein generating the GUI comprises modifying a characteristic of the link based on the information gathered during execution of the computer program.

21. The method of claim 20, wherein the characteristic of the link comprises at least one characteristic selected from the group consisting of: a size, a shape, and a color.

22. At least one non-transitory computer-readable storage medium storing processor-executable instructions that, when executed by at least one hardware processor, cause the at least one hardware processor to perform:
   generating information indicative of execution flow of a computer program at least in part by analyzing source code of the computer program;
   executing the computer program;
   obtaining information gathered during execution of the computer program; and
   generating a graphical user interface (GUI) for documenting the computer program using the information indicative of the execution flow and the information gathered during execution of the computer program, the generating comprising:
      generating a first graph based on the execution flow of the computer program, the first graph comprising a first plurality of nodes associated with code portions in the source code,
      generating a second graph from the first graph at least in part by:
         determining whether to remove a first node of the first plurality of nodes in the first graph, wherein determining whether to remove the first node comprises:
            determining whether the identifying a first node from the first plurality of nodes that is associated with a code portion that includes a variable indicated by one or more business rules, and
            removing the first node from the first graph to generate the second graph comprising a second plurality of nodes when the first node is not associated with the code portion that includes the variable indicated by the one or more business rules, and
      generating a visualization of the second graph, the visualization comprising a plurality of GUI elements, each of which is associated with a corresponding node of the second plurality of nodes of the second graph,
   wherein the plurality of GUI elements are organized based on an order of execution of the code portions associated with the corresponding nodes of the second graph.

* * * * *

UNITED STATES PATENT AND TRADEMARK OFFICE
CERTIFICATE OF CORRECTION

PATENT NO.         : 10,606,727 B2
APPLICATION NO.    : 15/695222
DATED              : March 31, 2020
INVENTOR(S)        : Jacob Harris Apkon et al.

Page 1 of 1

It is certified that error appears in the above-identified patent and that said Letters Patent is hereby corrected as shown below:

In the Claims

In Claim 22, at Column 32, Lines 19 and 20 delete "identifying a" and "from the first plurality of nodes that"

Signed and Sealed this
Twenty-third Day of June, 2020

Andrei Iancu
*Director of the United States Patent and Trademark Office*